(12) United States Patent
Masuko

(10) Patent No.: US 8,582,885 B2
(45) Date of Patent: Nov. 12, 2013

(54) IMAGE PROVIDING DEVICE, IMAGE PROCESSING METHOD, IMAGE PROCESSING PROGRAM, AND RECORDING MEDIUM

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/819,102

(22) PCT Filed: Apr. 2, 2012

(86) PCT No.: PCT/JP2012/058825
§ 371 (c)(1),
(2), (4) Date: Feb. 26, 2013

(87) PCT Pub. No.: WO2012/176522
PCT Pub. Date: Dec. 27, 2012

(65) Prior Publication Data
US 2013/0156316 A1    Jun. 20, 2013

(30) Foreign Application Priority Data
Jun. 24, 2011 (JP) .................... 2011-140289

(51) Int. Cl.
*G06K 9/34* (2006.01)
(52) U.S. Cl.
USPC .......................................... 382/173
(58) Field of Classification Search
USPC ........ 382/173, 284, 294; 358/1.15, 1.18, 447, 358/463; 345/582, 627
See application file for complete search history.

(56) References Cited

U.S. PATENT DOCUMENTS

| | | | |
|---|---|---|---|
| 6,556,210 B1 | 4/2003 | Yamamoto et al. | |
| 6,927,874 B1 | 8/2005 | Enokida et al. | |
| 2011/0050723 A1 | 3/2011 | Tokunaga et al. | |

FOREIGN PATENT DOCUMENTS

| | | |
|---|---|---|
| JP | 11-341266 A | 12/1999 |
| JP | 2000-295453 A | 10/2000 |
| JP | 2001-238067 A | 8/2001 |
| JP | 2010-4166 A | 1/2010 |
| JP | 2011-78078 A | 4/2011 |

OTHER PUBLICATIONS

Kazuyo Kojima et al., "Decorative Photomosaics Respecting Human Visual Perception", Information Processing Society of Japan, Jul. 2008, pp. 2703-2711, vol. 49, No. 7.
Keita Funahashi et al., "Real-time photo mosaic for database generation of edge feature", Eizo Media Shori Symposium Dai 14 Kai Symposium Shiryo, Oct. 2009, pp. 89-90.
Shinichi Doi et al., "Photo Paint on PSP2P Network", Synposium on Multimedia, Distributed, Cooperative and Mobile Systems (DICOMO2009) Ronbunsho, Jul. 2009, pp. 1855-1862, vol. 2009, No. 1.
International Search Report for PCT/JP2012/058825 dated Jun. 26, 2012.

*Primary Examiner* — Duy M Dang
(74) *Attorney, Agent, or Firm* — Sughrue Mion, PLLC

(57) ABSTRACT

When assigning an acquired image to a region that satisfies conditions where the acquired image can be assigned, the acquired image is not wasted as much as possible. An image providing device acquires an image specified by a user, searches for a region satisfying conditions where the acquired posted image can be assigned, and assigns the acquired image to the searched region. If there is no region that satisfies the conditions where the acquired posted image can be assigned, the image providing device further divides any one of regions to which no image is assigned into a plurality of regions, assigns the acquired image to a region satisfying conditions where the acquired image can be assigned among a plurality of regions formed by division, and causes a mosaic image in which the acquired image is placed to be displayed based on assignment.

9 Claims, 13 Drawing Sheets

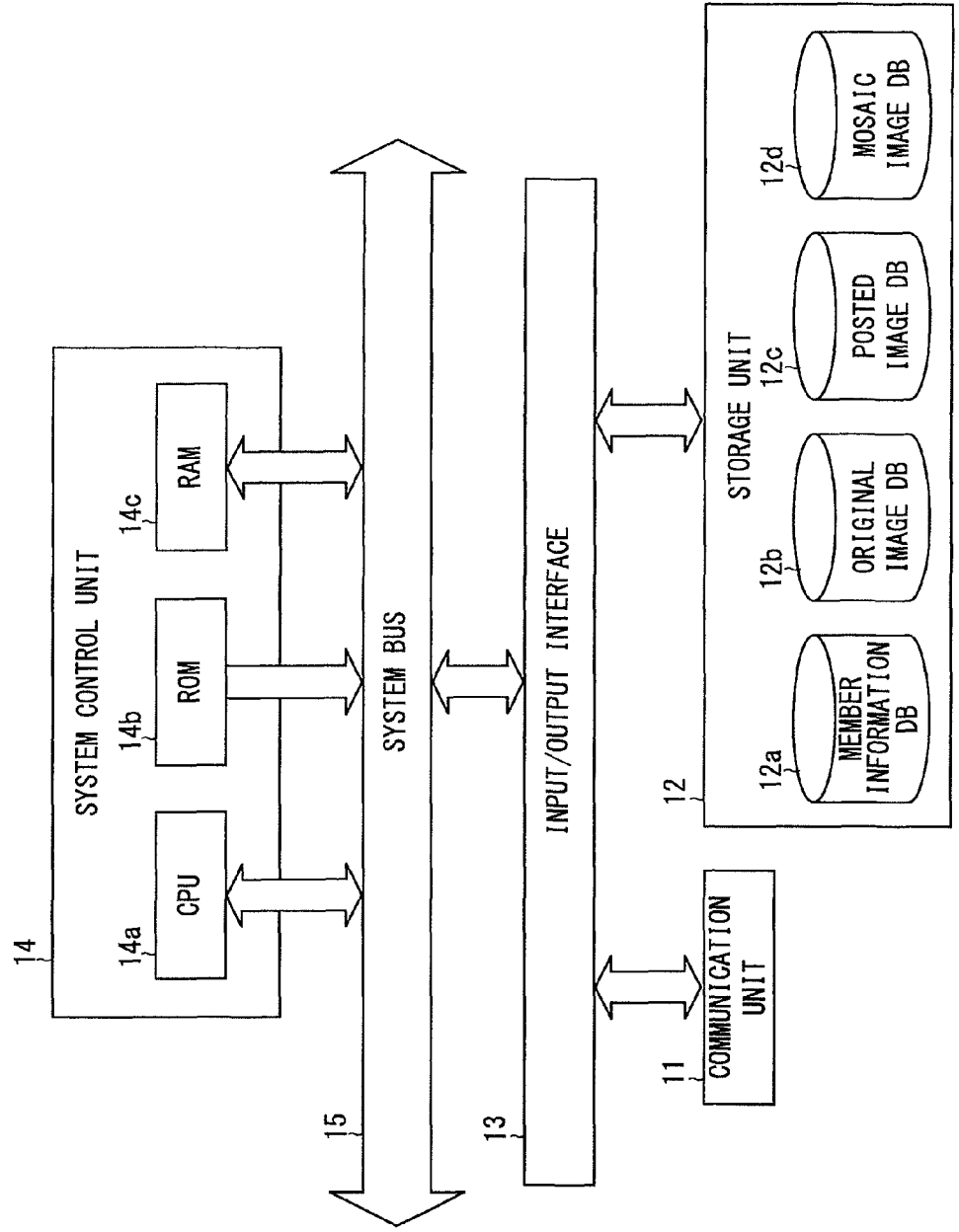

FIG.6A
MEMBER INFORMATION DB 12a

| USER ID |
|---|
| PASSWORD |
| NICKNAME |
| NAME |
| DATE OF BIRTH |
| GENDER |
| ADDRESS |
| PHONE NUMBER |
| EMAIL ADDRESS |
| . . . |

FIG.6B
ORIGINAL IMAGE DB 12b

| ORIGINAL IMAGE ID |
|---|
| ORIGINAL IMAGE DATA |
| BASIC DIVISION NUMBER INFORMATION |
| BASIC REGION INFORMATION (0, 0) |
| BASIC REGION INFORMATION (0, 1) |
| BASIC REGION INFORMATION (0, 2) |
| . . . |

FIG.6C
BASIC REGION INFORMATION (X1, Y1)

| REPRESENTATIVE COLOR VALUE |
|---|
| CHILD REGION INFORMATION 1 |
| CHILD REGION INFORMATION 2 |
| CHILD REGION INFORMATION 3 |
| . . . |

FIG.6D
CHILD REGION INFORMATION N(X1, Y1)

| REPRESENTATIVE COLOR VALUE N(X1, Y1)(0, 0) |
|---|
| REPRESENTATIVE COLOR VALUE N(X1, Y1)(0, 1) |
| REPRESENTATIVE COLOR VALUE N(X1, Y1)(0, 2) |
| . . . |

FIG.6E
POSTED IMAGE DB 12c

| MOSAIC IMAGE ID |
|---|
| NUMBER OF POSTED IMAGES |
| POSTED IMAGE INFORMATION 1 |
| POSTED IMAGE INFORMATION 2 |
| POSTED IMAGE INFORMATION 3 |
| . . . |

FIG.6F
POSTED IMAGE INFORMATION

| IMAGE NUMBER |
|---|
| USER ID |
| POSTED IMAGE DATA |
| REPRESENTATIVE COLOR VALUE |

FIG.7A
MOSAIC IMAGE DB 12d

| MOSAIC IMAGE ID |
|---|
| ORIGINAL IMAGE ID |
| TOTAL NUMBER OF REGIONS |
| ASSIGNED IMAGE INFORMATION (0, 0) |
| ASSIGNED IMAGE INFORMATION (0, 1) |
| ASSIGNED IMAGE INFORMATION (0, 2) |
| . . . |
| MOSAIC IMAGE DISPLAY DATA |

FIG.7B
ASSIGNED IMAGE INFORMATION (X1, Y1)

| DIVISION FLAG = OFF |
|---|
| ASSIGNED IMAGE NUMBER (X1, Y1) |

FIG.7C
ASSIGNED IMAGE INFORMATION (X1, Y1)

| DIVISION FLAG = ON |
|---|
| PATTERN NUMBER |
| ASSIGNED IMAGE NUMBER (X1, Y1) (0, 0) |
| ASSIGNED IMAGE NUMBER (X1, Y1) (0, 1) |
| ASSIGNED IMAGE NUMBER (X1, Y1) (0, 2) |
| . . . |

FIG.7D
DIVISION PATTERN TABLE

| NUMBER OF DIVISION PATTERNS |
|---|
| CHILD DIVISION NUMBER INFORMATION 1 |
| CHILD DIVISION NUMBER INFORMATION 2 |
| CHILD DIVISION NUMBER INFORMATION 3 |
| . . . |

IMAGE PROVIDING DEVICE, IMAGE PROCESSING METHOD, IMAGE PROCESSING PROGRAM, AND RECORDING MEDIUM

CROSS REFERENCE TO RELATED APPLICATIONS

This application is a National Stage of International Application No. PCT/JP2012/058825 filed Apr. 2, 2012, claiming priority based on Japanese Patent Application No. 2011-140289 filed Jun. 24, 2011, the contents of all of which are incorporated herein by reference in their entirety.

TECHNICAL FIELD

The present invention relates to a technical field of an image providing device and an image processing method for causing a mosaic image formed by combining images acquired from a terminal device to be presented.

BACKGROUND ART

Conventionally, as a representation method of an image in, for example, a poster and a Web page used for an advertisement, a notice of an event, and the like, a method is known in which a plurality of images to be combined (hereinafter referred to as "material images") are arranged like tiles and the images are represented as a mosaic image (for example, a mosaic art and a photo mosaic). In this representation method, for example, an image (hereinafter referred to as an "original image") to be an original of a picture of the mosaic image is divided into a plurality of regions. Each material image is assigned to, for example, a region whose color tone, pattern or the like is similar to those of the material image. Thereby, a mosaic image which represents a picture of the original image is generated.

On the other hand, a technique is known in which a server device acquires images, which are provided from a user as material images, from a terminal device through a network and causes the terminal device to display a mosaic image generated by using the acquired images. In this case, what images are the material images depends on a determination of the user who provides the images. Therefore, when such images are used as the material images, a problem to be solved is how to generate a mosaic image which has high recognizability of a picture of the original image.

For example, Patent Literature 1 discloses a technique, the object of which is to provide a mosaic image that has high recognizability. Specifically, when a mosaic image providing device determines a block, in which a material image posted by a user is placed, from a plurality of blocks obtained by dividing a target image which is an original of the mosaic image, the mosaic image providing device determines a block selected by the user to be a block in which the material image is placed or automatically determines a block in which the material image is placed without being limited by an image of the block. Further, the mosaic image providing device corrects color of a material image so that an average density value of a basic color of the material image is an average density value of the basic color of a block in which the material image is placed. Furthermore, until when the number of material images posted by the user reaches a number necessary to complete the mosaic image, a mosaic image in which the material images are placed in only a part of the blocks is displayed on the terminal device. In other words, a mosaic image in an uncompleted state is displayed.

CITATION LIST

Patent Literature

Patent Literature 1: JP 2010-4166 A

SUMMARY OF INVENTION

Technical Problem

In a mosaic image, to increase the recognizability of the picture of the original image, it is necessary to set conditions of a region to which an image can be assigned (for example, conditions of a color tone, a pattern, and the like) and not to use an image provided by a user in the mosaic image when there is no region that satisfies the conditions where the image can be assigned. However, when such an operation is performed, the image provided by the user is wasted.

On the other hand, in the technique described in Patent Literature 1, it is possible to place any material image in any block. However, the color of the material image is changed, so that the original color of the material image is not usefully used to generate the mosaic image.

The present invention is made in view of the above situation, and an object of the present invention is to provide an image providing device, an image processing method, an image processing program, and a recording medium in which, when an acquired image is assigned to a region satisfying conditions where the acquired image can be assigned, the acquired image is not wasted as much as possible.

Solution to Problem

In order to achieve the above object, an invention described in claim 1 is an image providing device for providing a mosaic image of an original image divided into a plurality of regions, the image providing device comprising: an acquisition means that acquires an image specified by a user; a first search means that searches for a region satisfying conditions where the acquired image can be assigned; a first assignment means that assigns the acquired image to the region searched for by the first search means; a dividing means that further divides any one of regions to which no image is assigned into a plurality of regions when there is no region satisfying the conditions where the acquired image can be assigned as a result of the search by the first search means; a second assignment means that assigns the acquired image to a region satisfying the conditions where the acquired image can be assigned among the plurality of regions formed by the division by the dividing means; and a presentation means that, on the basis of the assignment by the first assignment means or the second assignment means, causes a mosaic image in which the acquired image is placed to be presented.

According to this invention, when there is no region that satisfies the conditions where the acquired image can be assigned, any one of regions to which no image is assigned is further divided into a plurality of regions. Thereby, a plurality of new regions is formed, so that there may be a region that satisfies the conditions where the acquired image can be assigned. If there is a region that satisfies the conditions where the acquired image can be assigned among the newly formed regions, the acquired image is assigned to the region. Therefore, it is possible not to waste the acquired image as much as possible.

An invention described in claim 2 is the image providing device according to claim 1, further comprising: a determination means that determines whether or not the number of regions to which no image is assigned is smaller than or equal to a preset number, wherein the dividing means performs division only when it is determined that the number of regions to which no image is assigned is smaller than or equal to the preset number.

Generally, a region to which no image is assigned will be a candidate to which the acquired image is assigned. Therefore, the greater the number of regions to which no image is assigned, the higher the probability that there is a region that satisfies the conditions where the acquired image can be assigned. According to this invention, when there is a certain number of regions to which no image is assigned and it is possible not to waste the acquired image to some extent, no region is divided, so that it is possible to suppress the increase of the number of images required to complete the mosaic image.

An invention described in claim 3 is the image providing device according to claim 1 or 2, further comprising: a second search means that, when there is no region satisfying the conditions where the acquired image can be assigned as a result of the search by the first search means, searches for a region satisfying the conditions where the acquired image can be assigned from a plurality of regions formed if each of regions to which no image is assigned is divided, wherein the dividing means divides a certain region among the regions to which no image is assigned, the certain region being a region from which a region searched for by the second search means is formed if the certain region is divided.

According to this invention, a region that satisfies the conditions where the acquired image can be assigned is searched for from a plurality of regions formed if each of the regions to which no image is assigned is divided. Therefore, a region in which a region that satisfies the conditions where the acquired image can be assigned is formed by the division is actually divided and the acquired image is assigned to an actually formed region that satisfies the conditions where the acquired image can be assigned. As the number of regions to which no image is assigned increases, the number of regions formed if the division is performed increases, so that the number of regions that may satisfy the conditions where the acquired image can be assigned increases. Therefore, it is possible to increase the probability that a region that satisfies the conditions where the acquired image can be assigned is detected.

An invention described in claim 4 is the image providing device according to any one of claims 1 to 3, further comprising: a second search means that, when there is no region satisfying the conditions where the acquired image can be assigned as a result of the search by the first search means, searches for a region satisfying the conditions where the acquired image can be assigned from a plurality of regions formed if a certain region to which no image is assigned is divided by each of a plurality of division modes different from each other, wherein the dividing means divides the certain region by a division mode by which the region searched for by the second search means is formed.

According to this invention, a region that satisfies the conditions where the acquired image can be assigned is searched for from a plurality of regions formed if a region to which no image is assigned is divided by each of a plurality of division modes. A region to which no image is assigned is actually divided by the division mode by which a region that satisfies the conditions where the acquired image can be assigned is formed by division and the acquired image is assigned to an actually formed region that satisfies the conditions where the acquired image can be assigned. It is possible to form regions different from regions formed by another division mode according to the division mode, so that it is possible to increase the number of regions that may satisfy the conditions where the acquired image can be assigned. Therefore, it is possible to increase the probability that a region that satisfies the conditions where the acquired image can be assigned is detected.

An invention described in claim 5 is the image providing device according to claim 4, wherein the division mode includes the number of regions formed by division, and the smaller the number of regions formed by division the division mode includes, the more preferentially the dividing means determines the division mode to be a division mode used to perform the division.

According to this invention, a region that satisfies the conditions where the acquired image can be assigned is searched for from a plurality of regions formed if a region to which no image is assigned is divided by each of a plurality of the numbers of division. The smaller the number of division by which a region that satisfies the conditions where the acquired image can be assigned is formed by division, the more preferentially the number of division is determined to be the number of division used to actually perform the division. A region to which no image is assigned is actually divided by the determined number of division and the acquired image is assigned to an actually formed region that satisfies the conditions where the acquired image can be assigned. Therefore, it is possible to increase the probability that a region that satisfies the conditions where the acquired image can be assigned is detected and also it is possible to suppress the increase of the number of images required to complete the mosaic image.

An invention described in claim 6 is the image providing device according to any one of claims 3 to 5, further comprising: a color information generation means that generates in advance color information indicating a representative color of an image of each region formed if each region formed by dividing the original image in advance is divided by the dividing means; and a storage means that stores each piece of the generated color information, wherein, on the basis of color information indicating a representative color of the acquired image and color information indicating representative colors of images of regions to which no image is assigned, the first search means searches for a region satisfying the conditions where the acquired image can be assigned, and the second search means searches for a region satisfying the conditions where the acquired image can be assigned on the basis of the color information of the acquired image and the stored color information.

According to this invention, color information of each region formed by the division by the dividing means is generated in advance, so that it is not necessary to generate the color information of each region formed by the division when the second search means performs search. Therefore, it is possible to reduce the processing time of the search performed by the second search means.

An invention described in claim 7 is the image providing device according to any one of claims 3 to 5, further comprising: a color information generation means that, when the second search means searches for a region satisfying the conditions where the acquired image can be assigned from a plurality of regions formed if a certain region to which no image is assigned is divided, generates color information indicating a representative color of images of the formed regions, wherein, on the basis of color information indicating a representative color of the acquired image and color information indicating representative colors of images of regions to which no image is assigned, the first search means searches for a region satisfying the conditions where the acquired image can be assigned, and the second search means searches for a region satisfying the conditions where the acquired image can be assigned on the basis of the color information of the acquired image and the generated color information.

According to this invention, when there is no region that satisfies the conditions where the acquired image can be assigned as a result of the search by the first search means, the color information of the regions, which is necessary for the second search means to performs the search, is generated. Thereby, it is not necessary to generate color information of a plurality of regions formed if a region to which an image has already been assigned is divided. Therefore, it is possible to reduce the amount of processing required to generate the color information.

An invention described in claim 8 is an image processing method in an image providing device for providing a mosaic image of an original image divided into a plurality of regions, the image processing method comprising: an acquisition step of acquiring an image specified by a user; a first search step of searching for a region satisfying conditions where the acquired image can be assigned; a first assignment step of assigning the acquired image to the region searched for in the first search step; a dividing step of further dividing any one of regions to which no image is assigned into a plurality of regions when there is no region satisfying the conditions where the acquired image can be assigned as a result of the search in the first search step; a second assignment step of assigning the acquired image to a region satisfying the conditions where the acquired image can be assigned among the plurality of regions formed by the division in the dividing step; and a presentation step of, on the basis of the assignment in the first assignment step or the second assignment step, causing a mosaic image in which the acquired image is placed to be presented.

An invention described in claim 9 is an image processing program that causes a computer included in an image providing device for providing a mosaic image of an original image divided into a plurality of regions to function as: an acquisition means that acquires an image specified by a user; a first search means that searches for a region satisfying conditions where the acquired image can be assigned; a first assignment means that assigns the acquired image to the region searched for by the first search means; a dividing means that further divides any one of regions to which no image is assigned into a plurality of regions when there is no region satisfying the conditions where the acquired image can be assigned as a result of the search by the first search means; a second assignment means that assigns the acquired image to a region satisfying the conditions where the acquired image can be assigned among the plurality of regions formed by the division by the dividing means; and a presentation means that, on the basis of the assignment by the first assignment means or the second assignment means, causes a mosaic image in which the acquired image is placed to be presented.

An invention described in claim 10 is a recording medium in which an image processing program is computer-readably recorded, the image processing program causing a computer, which is included in an image providing device for providing a mosaic image of an original image divided into a plurality of regions, to function as: an acquisition means that acquires an image specified by a user; a first search means that searches for a region satisfying conditions where the acquired image can be assigned; a first assignment means that assigns the acquired image to the region searched for by the first search means; a dividing means that further divides any one of regions to which no image is assigned into a plurality of regions when there is no region satisfying the conditions where the acquired image can be assigned as a result of the search by the first search means; a second assignment means that assigns the acquired image to a region satisfying the conditions where the acquired image can be assigned among the plurality of regions formed by the division by the dividing means; and a presentation means that, on the basis of the assignment by the first assignment means or the second assignment means, causes a mosaic image in which the acquired image is placed to be presented.

Advantageous Effects of Invention

According to the present invention, when there is no region that satisfies the conditions where the acquired image can be assigned, any one of regions to which no image is assigned is further divided into a plurality of regions. Thereby, a plurality of new regions is formed, so that there may be a region that satisfies the conditions where the acquired image can be assigned. If there is a region that satisfies the conditions where the acquired image can be assigned among the newly formed regions, the acquired image is assigned to the region. Therefore, it is possible not to waste the acquired image as much as possible.

BRIEF DESCRIPTION OF DRAWINGS

FIG. 5 is a block diagram showing an example of a schematic configuration of a mosaic image providing server 1 according to the embodiment.

FIG. 6A is a diagram showing an example of content registered in a member information DB 12a according to the embodiment. FIG. 6B is a diagram showing an example of content registered in an original image DB 12b. FIG. 6C is a diagram showing an example of content included in basic region information. FIG. 6D is a diagram showing an example of content included in child region information. FIG. 6E is a diagram showing an example of content registered in a posted image DB 12c. FIG. 6F is a diagram showing an example of content included in posted image information.

FIG. 7A is a diagram showing an example of content registered in a mosaic image DB 12d according to the embodiment. FIGS. 7B and 7C are diagrams showing an example of content included in assigned image information. FIG. 7D is a diagram showing an example of content included in a division pattern table.

DESCRIPTION OF EMBODIMENT

Hereinafter, an embodiment of the present invention will be described in detail with reference to the drawings. The embodiment described below is an embodiment where the present invention is applied to a mosaic image providing system.

1. Schematic Configuration and Function of Mosaic Image Providing System

Figure 1:
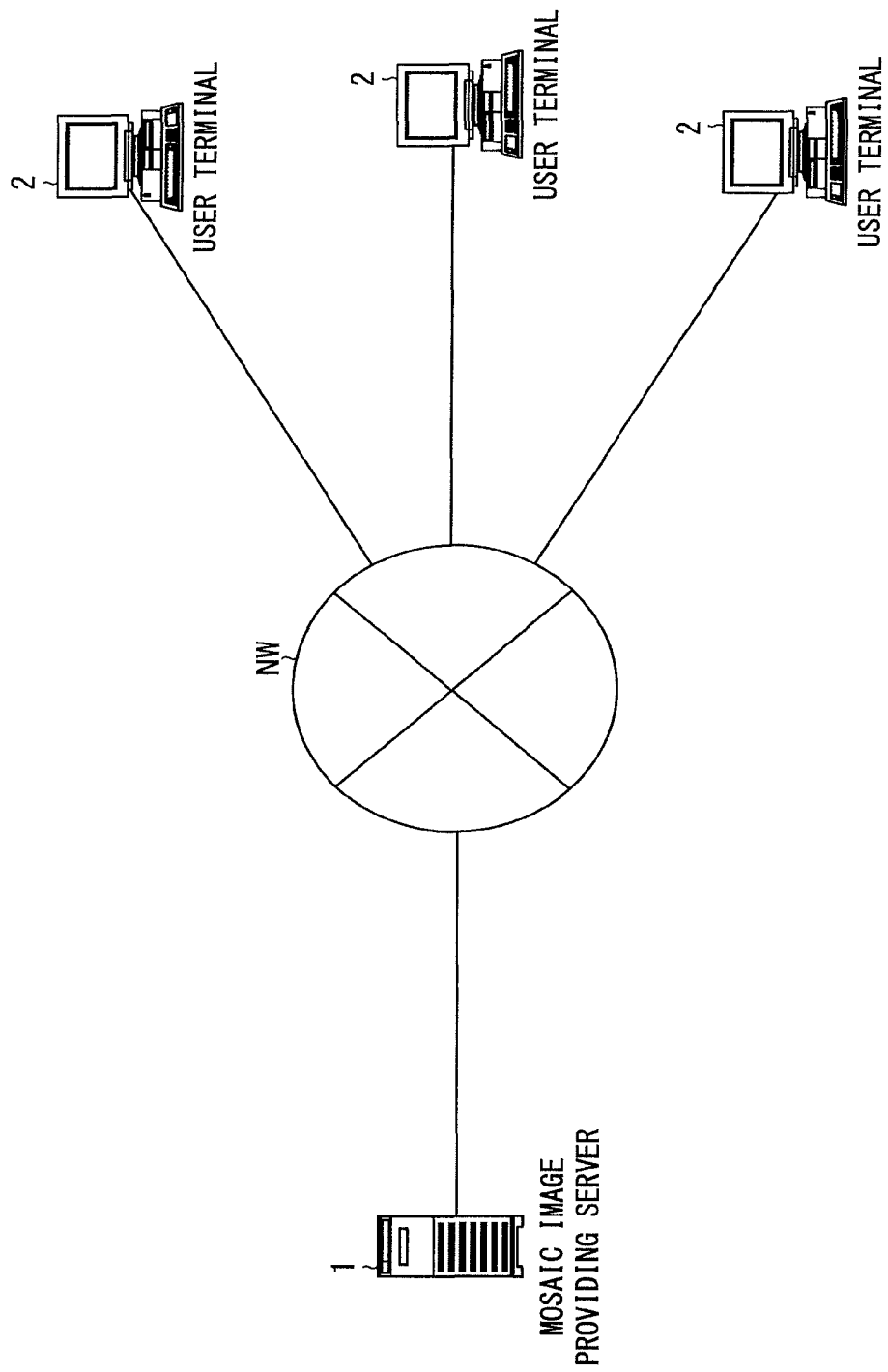
FIG. 1 is a diagram showing an example of a schematic configuration of a mosaic image providing system S according to an embodiment.

First, configuration and function of a mosaic image providing system S according to the embodiment will be described with reference to FIGS. 1 to 4. FIG. 1 is a diagram showing an example of a schematic configuration of the mosaic image providing system S according to the embodiment.

As shown in FIG. 1, the mosaic image providing system S is configured to include a mosaic image providing server 1 and a plurality of user terminals 2. The mosaic image providing server 1 and each user terminal 2 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and gateways.

The mosaic image providing server 1 (an example of an image providing device of the present invention) is a Web server that transmits a Web page in which a mosaic image is displayed to a user terminal 2. The mosaic image is formed by arranging (combining) a plurality of images to be materials in a pattern like tiles. The mosaic image providing server 1 acquires images from each user terminal 2 through the network NW in order to collect images to be materials. The image acquired from the user terminal 2 is an image posted by a user (hereinafter referred to as a "posted image").

The user terminal 2 is a terminal device of a user who uses the mosaic image providing system S. The user terminal 2 accesses the mosaic image providing server 1 on the basis of an operation from a user. Thereby, the user terminal 2 receives a Web page from the mosaic image providing server 1 and displays the Web page. The user posts an image to be a material of a mosaic image and causes the mosaic image to be displayed through a Web page displayed on a screen of the user terminal 2. In the user terminal 2, software such as a browser and an email client is installed. For example, a personal computer, a PDA (Personal Digital Assistant), a mobile information terminal such as a smartphone, and a mobile phone are used as the user terminal 2.

In the mosaic image providing system S having such a configuration, for example, an image to be an origin of a picture of the mosaic image is prepared in advance. This image is an original image. The mosaic image providing server 1 arranges posted images so that the picture represented by the mosaic image is similar to the picture represented by the original image.

Figure 2:
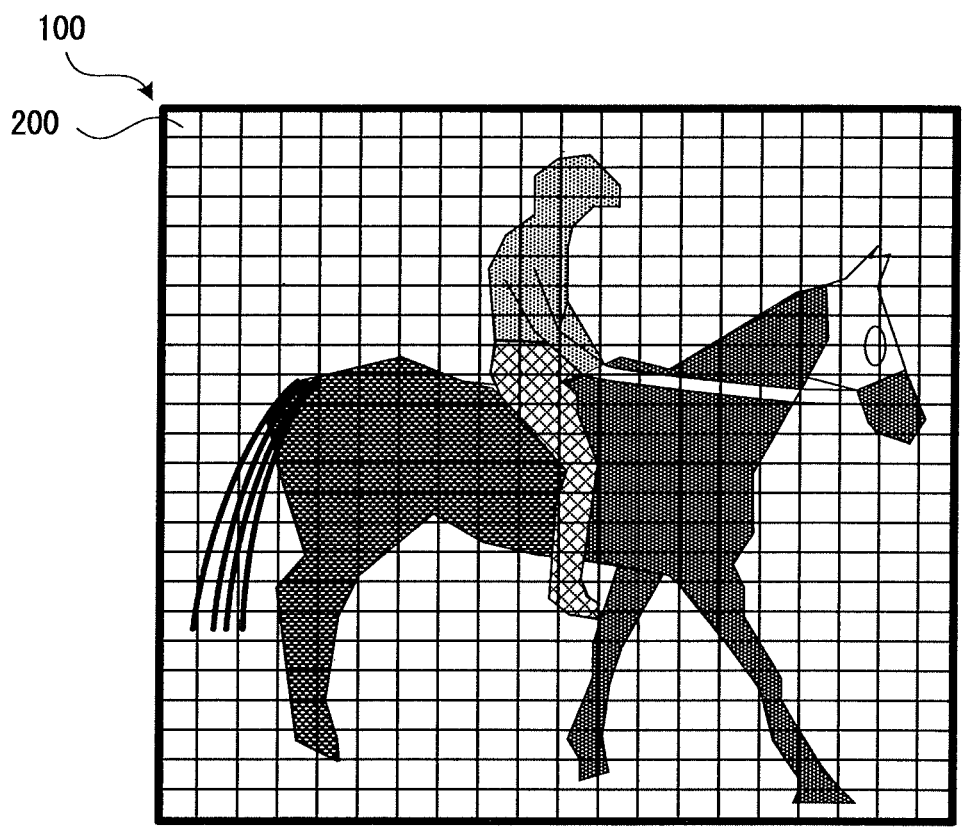
FIG. 2 is a diagram showing an example of a case in which an original image 100 is divided into 480 divided regions.

FIG. 2 is a diagram showing an example of the original image. An image 100 shown in FIG. 2 is an image representing a picture of a walking horse and a horseman riding the horse. Here, it is assumed that the color of the horse is dark brown. Also it is assumed that the color of the trousers of the horseman is yellow and the color of the jacket of the horseman is light blue. Further, it is assumed that the color of the background is white. It is assumed that each portion is not filled with a uniform color but there is some color variation depending on positions.

The original image is divided into a plurality of regions (hereinafter referred to as "divide regions") indicated by reference numeral 200. For example, the image 100 is divided into 20 regions in the horizontal direction and 24 regions in the vertical direction to be a total of 480 divided regions. The number of the divided regions is referred to as "the number of division". A posted image acquired from the user terminal 2 is assigned to each divided region. Assigning a posted image to a divided region means placing the posted image to a position corresponding to a divided region that is an assigned destination in a mosaic image.

Every time the mosaic image providing server 1 acquires a posted image from the user terminal 2, the mosaic image providing server 1 searches for divided regions that satisfy conditions where the acquired posted image can be assigned from divided regions to which a posted image has not yet been assigned (hereinafter referred to as "unassigned regions"). In present embodiment, the divided region that satisfies conditions where the acquired posted image can be assigned is a divided region of which representative color of an image is similar to a representative color of the posted image by more than a certain degree. The representative color of an image (hereinafter referred to as a "representative color") is, for example, a color obtained by averaging colors of the entire image. The mosaic image providing server 1 assigns the posted image to any one of the divided regions that satisfy conditions where the posted image can be assigned. Then, the mosaic image providing server 1 generates a web page where a mosaic image in which posted images collected so far are arranged is displayed. Therefore, a mosaic image in an uncompleted state is displayed on the Web page until the number of collected posted images reaches the number of division of the original image. In other words, there are regions in which no posted image is placed in the mosaic image. The mosaic image in this state may be difficult to be recognized by a user who sees the mosaic image as a picture of the original image that should be represented by the mosaic image.

Figure 3A:
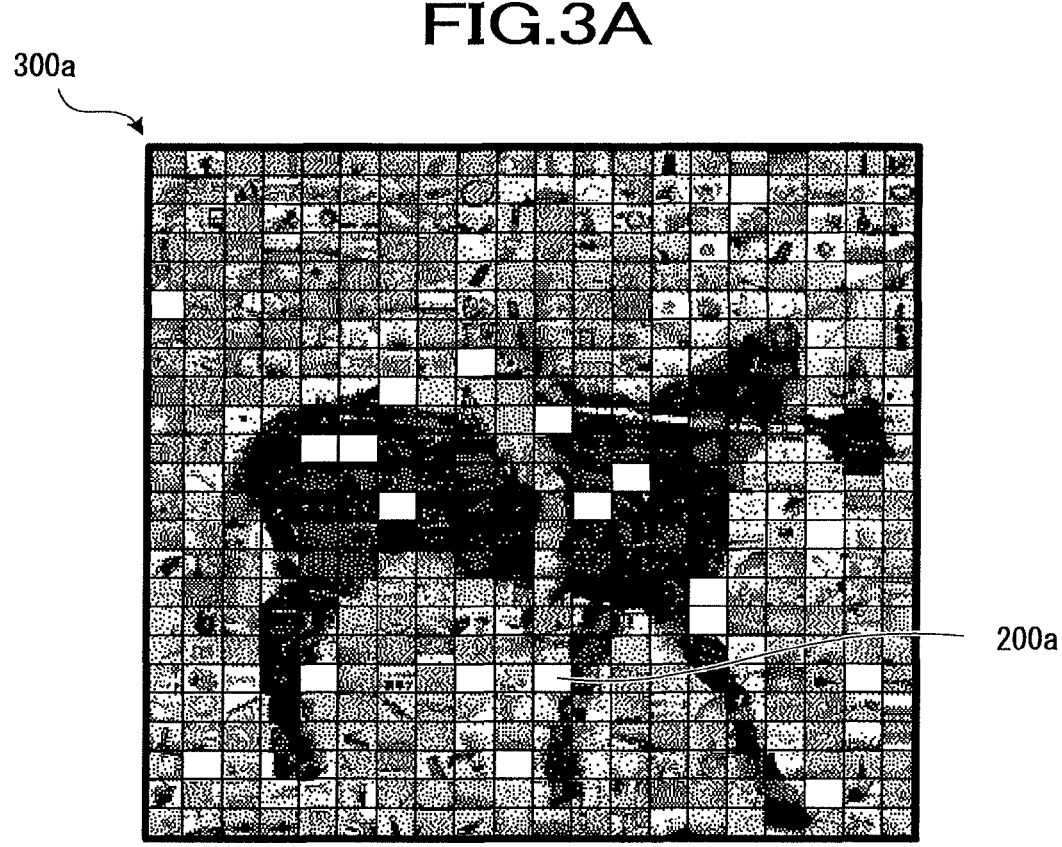
FIG. 3A is a diagram showing a display example of a mosaic image and FIG. 3B is a diagram showing a part of the mosaic image after a basic region is divided.

FIG. 3A is a diagram showing a display example of the mosaic image. The mosaic image shown in FIG. 3A is a mosaic image 300a in an uncompleted state when the original image is the image 100. The grid pattern on the mosaic image 300a represents boundary lines of the divided regions. When the mosaic image is displayed in a web page, the grid pattern is not displayed.

In the mosaic image 300a, there are 20 unassigned regions. Thereafter, it is assumed that the mosaic image providing server 1 searches the 20 unassigned regions for divided regions that satisfy conditions where the posted image acquired from a certain user terminal 2 by the mosaic image providing server 1 can be assigned and as a result the mosaic image providing server 1 determines that there is no divided region that satisfies the conditions. Then, the mosaic image providing server 1 further divides one divided region of the 20 unassigned regions into a plurality of divided regions and assigns the posted image to a divided region that satisfies the conditions where the posted image can be assigned among the plurality of divided regions formed by the above division.

Figure 3B:
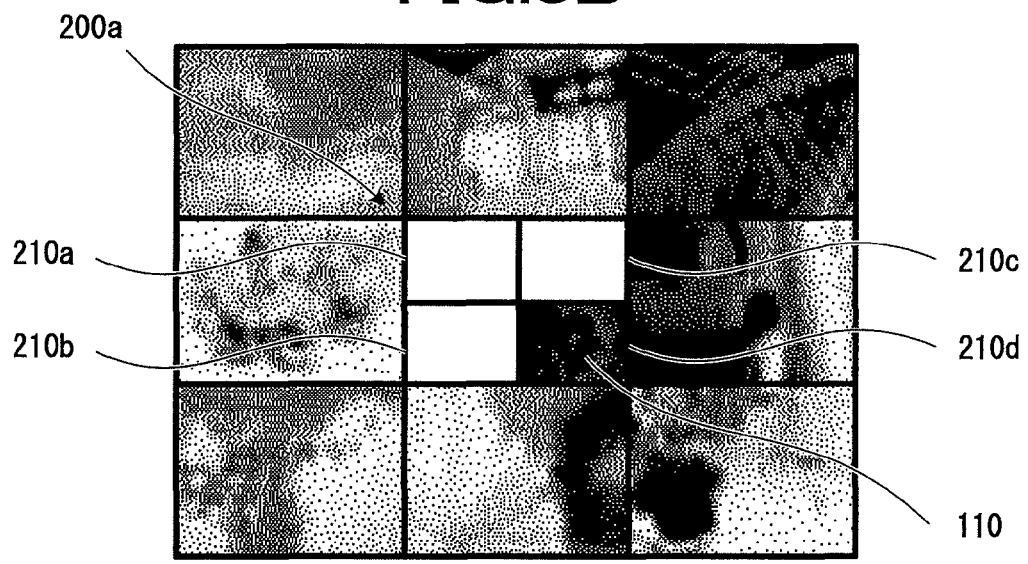

FIG. 3B is a diagram showing a part of the mosaic image after a basic region is divided. In an example illustrated in FIG. 3B, a divided region 200a, which is one of the unassigned regions, is divided into four divided regions 210a to 210d. Then, a posted image 110 is assigned to the divided region 210d. Here, the divided regions existing from the beginning are referred to as "basic regions". A total number of the basic regions is referred to as "the number of basic division". In the example illustrated in FIG. 2A, each divided region 200 is the basic region and the number of basic division is 480. On the other hand, the divided regions formed by dividing the basic region are referred to as "child regions". A total number of the child regions formed in one basic region is referred to as "the number of child division". In the example illustrated in FIG. 3B, the divided regions 210a to 210d are the child regions and the number of child division is 9.

When a basic region is divided, a plurality of child regions are formed as new divided regions, so that there may be a divided region that satisfies the conditions where the posted image can be assigned among the plurality of new divided regions. Therefore, it is possible not to waste the posted image as much as possible. The area of a child region formed by the division is smaller than the area of the basic region. Therefore, in the mosaic image, the resolution of a part that is a basic region which is divided into child regions increases, so that there is an aspect in which the recognizability of a picture of the part increases.

In practice, with respect to every unassigned region, the mosaic image providing server 1 performs a process for searching for a child region that satisfies the conditions where the posted image can be assigned from a plurality of child regions formed if the unassigned region is tentatively divided. Then, the mosaic image providing server 1 actually divides unassigned regions including a child region that satisfies the conditions where the posted image can be assigned. By doing so, it is possible to increase the probability that a child region that satisfies the conditions where the posted image can be assigned is detected.

A division pattern (division mode) of tentatively dividing one unassigned region is not only one pattern. The mosaic image providing server 1 searches for child region that satisfies the conditions where the posted image can be assigned from a plurality of child regions formed by dividing an unassigned region by each of a plurality of division patterns. Specifically, the mosaic image providing server 1 searches for child regions that satisfy the conditions where the posted image can be assigned from a plurality of child regions formed by dividing an unassigned region by a plurality of patterns of the number of child divisions.

Figure 4A:
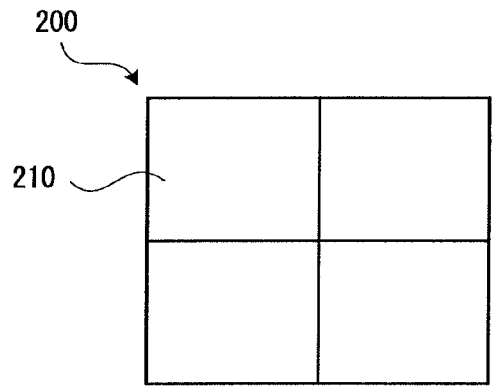
FIGS. 4A to 4C are diagrams showing an example of a divided mode of unassigned regions.
Figure 4B:
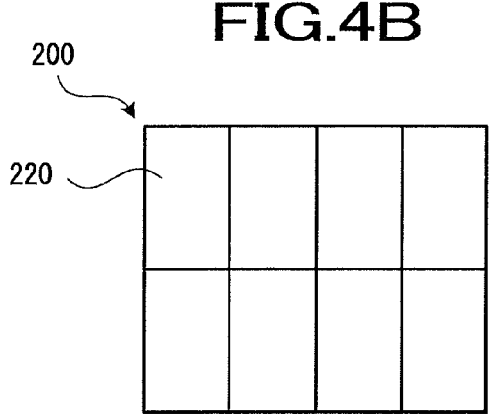
Figure 4C:
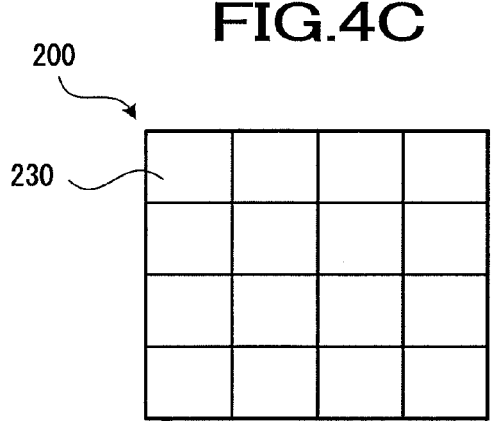

FIG. 4A is an example of a case in which the divided region 200 is divided into two regions in the horizontal direction and two regions in the vertical direction to be a total of four divided regions 210. FIG. 4B is an example of a case in which the divided region 200 is divided into four regions in the horizontal direction and two regions in the vertical direction to be a total of eight divided regions 220. FIG. 4C is an example of a case in which the divided region 200 is divided into four regions in the horizontal direction and four regions in the vertical direction to be a total of 16 divided regions 230.

The mosaic image providing server 1 searches for child region that satisfies the conditions where the posted image can be assigned by tentatively dividing an unassigned region by each of a plurality of patterns of the number of child divisions, for example, in ascending order of the number of child divisions. In the examples illustrated in FIGS. 4A, 4B, and 4C, the mosaic image providing server 1 tentatively divides each unassigned region into four regions and searches for child region that satisfies the conditions where the posted image can be assigned. At this time, when a child region that satisfies the conditions where the posted image can be assigned is detected, the mosaic image providing server 1 actually divides the unassigned region into four regions. On the other hand, when there is no child region that satisfies the conditions where the posted image can be assigned, the mosaic image providing server 1 tentatively divides each unassigned region into eight regions and searches for child regions that satisfy the conditions where the posted image can be assigned. At this time, when a child region that satisfies the conditions where the posted image can be assigned is detected, the mosaic image providing server 1 actually divides the unassigned region into eight regions. On the other hand, when there is no child region that satisfies the conditions where the posted image can be assigned, the mosaic image providing server 1 tentatively divides each unassigned region into 16 regions and searches for child regions that satisfy the conditions where the posted image can be assigned.

Even when the same basic region is divided, if the number of division is different, different child regions are formed. Therefore, if the basic region is divided by a plurality of division patterns, it is possible to increase the probability that a child region that satisfies the conditions where the posted image can be assigned is detected. The reason why the mosaic image providing server 1 preferentially uses a division pattern with the smaller number of child division when actually dividing a basic pattern is to suppress the number of posted images required to complete the mosaic image. However, the mosaic image providing server 1 may not use a division pattern in ascending order of the number of child divisions.

The division pattern is not limited to the number of child divisions. Between different division patterns, at least one of the position and the size of at least one child region in one division pattern may be different from that in the other division patterns. For example, FIG. 4B illustrates a division pattern of four regions in the horizontal direction and two regions in the vertical direction. On the other hand, when there is a division pattern of two regions in the horizontal direction and four regions in the vertical direction, although the two division patterns have the same number of child division, the two division patterns are formed by child regions different from each other.

If there is no divided region that satisfies conditions where the posted image can be assigned even though the process described above is performed, the mosaic image providing server 1 does not use the posted image and does not divide the basic regions.

Unassigned regions are divided only when the number of the unassigned regions is smaller than or equal to a preset number. The greater the number of unassigned regions, the greater the probability that there are divided regions that satisfy the conditions where the posted image can be assigned. Therefore, even if the unassigned regions are not divided, it is possible to suppress the posted image from being wasted to some extent. Thereby, it is possible to suppress the number of posted images required to complete the mosaic image.

2. Configuration of Mosaic Image Providing Server

Next, a configuration of the mosaic image providing server 1 will be described with reference to FIGS. 5 to 7.

FIG. 5 is a block diagram showing an example of a schematic configuration of the mosaic image providing server 1 according to the embodiment. As shown in FIG. 5, the mosaic image providing server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the user terminals 2 and the like.

The storage unit 12 (an example of a storage means of the present invention) includes, for example, a hard disk drive and the like. In the storage unit 12, a member information DB (database) 12a, an original image DB 12b, a posted image DB 12c, a mosaic image DB 12d, and the like are constructed.

FIG. 6A is a diagram showing an example of content registered in the member information DB 12a according to the embodiment. In the member information DB 12a, member information related to users registered as a member in the mosaic image providing system S is registered. Specifically, in the member information DB 12a, a user ID which is identification information of the user, a password, a nickname, a name, a date of birth, a gender, an address, a phone number, an email address, and the like are registered in association with each user.

FIG. 5B is a diagram showing an example of content registered in the original image DB 12b according to the embodiment. In the original image DB 12b, original images and information related to the original images are registered. Specifically, in the original image DB 12b, an original image ID which is identification information of the original image, original image data, basic division number information, a plurality of pieces of basic region information are registered in association with each original image.

The original image ID is identification information of an original image. The original image data is image data of an original image. Examples of a format of the image data used in the mosaic image providing system S include JPEG (Joint Photographic Experts Group), TIFF (Tagged-Image File Format), and PNG (Portable Network Graphics).

The basic division number information is information indicating the number of basic division. Specifically, the basic division number information includes the number of basic division, the number of basic horizontal division, and the number of basic vertical division. The number of basic horizontal division is the number of divided regions in the horizontal direction. Specifically, the number of basic horizontal division is the number of basic regions of the original image arranged in the horizontal direction. The number of basic vertical division is the number of divided regions in the vertical direction. Specifically, the number of basic vertical division is the number of basic regions of the original image arranged in the vertical direction. The number of basic division is obtained by multiplying the number of basic horizontal division by the number of basic vertical division.

The basic region information is information related to a basic region. The number of pieces of basic region information to be registered is equal to the number of basic division. Each basic region information is registered in association with an index of a corresponding basic region. An index having a form of (X1, Y1) is assigned to each basic region. Here, X indicates a position of the basic region in the horizontal direction. Y indicates a position of the basic region in the vertical direction. The index of the basic region located at the upper left corner of the original image is (0, 0). The basic region (X1, Y1) is a basic region located at the (Y1+1)th position from the uppermost position among the basic regions located at the (X1+1)th position from the leftmost position.

Dividing the original image into a plurality of regions is dividing a region corresponding to the entire original image into a plurality of regions, that is, making it possible to specify in what region each pixel in the original image is included (or what pixels each region includes). The system control unit 14 can specify a region in which each pixel is included by acquiring the numbers of pixels in the original image in the vertical and horizontal directions and the numbers of horizontal division and vertical division of the original image. Therefore, dividing the original image into a plurality of regions does not necessarily mean dividing the image data of the original image into image data of each region. Therefore, the system control unit 14 may register image data of each region into the original image DB 12b or need not register image data of each region into the original image DB 12b.

FIG. 6C is a diagram illustrating an example of content included in the basic region information. As illustrated in FIG. 6C, in the basic region information, a representative color value and one or more pieces of child region information are included.

The representative color value (an example of color information of the present invention) is a value indicating a representative color of the basic region. For example, the representative color may be a color obtained by averaging colors in the entire divided region or may be a color occupying the largest area in the divided region. The representative color value includes a value for each basic color (primary color) of R (red), G (green), and B (blue). For example, each value of R, G, and B can be any value from 0 to 255. The system control unit 14 determines a candidate of a divided region to which a posted image is assigned by comparing the representative color value of divided regions and the representative color value of the posted image. The representative color value may be represented by, for example, the CMYK color space, the Lab color space, or the like.

The child region information is information related to a child region formed when the basic region is divided. The number of pieces of child region information to be registered is equal to the number of patterns of the number of child divisions. An index having a form of N(X1, Y1) is assigned to each child region. N (N is an integer greater than or equal to 1) is a pattern number of the number of child division (hereinafter referred to as a "pattern number").

FIG. 6D is a diagram showing an example of content included in the child region information. As illustrated in FIG. 6D, in the child region information, a plurality of representative color values are included.

The representative color value is a value indicating a representative color of the child region. Content of the representative color value of the child region is the same as the content of the representative color value of the basic region. The number of representative color values to be registered is equal to the number of child division corresponding to the pattern number N. Each representative color value is registered in association with indexes of corresponding number of child division, basic region, and child region. An index having a form of child region (X1, Y1)(X2, Y2) is assigned to each child region. Here, X1 and Y1 are an index of the basic region in which the child region is included. X2 indicates a position of the child region in the horizontal direction in the basic region (X1, Y1). Y2 indicates a position of the child region in the vertical direction in the basic region (X1, Y1). An index of the child region located at the upper left corner of the basic region (X1, Y1) is (0, 0). The child region (X1, Y1)(X2, Y2) is a child region located at the (Y2+1)th position from the uppermost position among the child regions located at the (X2+1)th position from the leftmost position in the basic region (X1, Y1).

The representative color value N(X1, Y1)(X2, Y2) is a representative color value of the child region (X1, Y1)(X2, Y2), which is formed when the basic region (X1, Y1) is divided into child regions, the number of which is the number of child division corresponding to the index N.

FIG. 6e is a diagram showing an example of content registered in the posted image DB 12c according to the embodiment. In the posted image DB 12c, posted images and information related to the posted images are registered. Specifically, in the posted image DB 12c, a mosaic image ID, the number of posted images, and posted image information are registered. The mosaic image ID is identification information of a mosaic image generated by using the registered posted images as materials. The number of posted images is the number of posted images acquired so far from the user terminal 2. The number of pieces of posted image information to be registered is equal to the number of posted images.

FIG. 6f is a diagram showing an example of content included in the posted image information. As shown in FIG. 6f, in the posted image information, an image number, a user ID, posted image data, and a representative color value are included in association with each other. The image number is a number given to the posted image. An image number is given to each posted image in posting order (in an order in which the mosaic image providing server 1 acquires the posted images). The user ID included in the posted image information is a user ID of a user who posted the posted image. In other words, the user ID included in the posted image information is a user ID of a user who uses the user terminal 2 from which the posted image is acquired. The posted image data is image data of the posted image. The representative color value is a value indicating a representative color of the posted image. Content of the representative color value of the posted image is the same as the content of the representative color value of a divided region.

FIG. 7A is a diagram illustrating an example of content registered in the mosaic image DB12d according to the embodiment. In the mosaic image DB 12d, information related to the mosaic image is registered. Specifically, in the mosaic image DB 12d, a mosaic image ID, an original image ID, a total number of regions, a plurality of pieces of assigned image information, and mosaic image display data are registered in association with each mosaic image. The mosaic image ID is identification information of the mosaic image. The original image ID is an original image ID of an image of a picture of the mosaic image. The assigned image information is information indicating a posted image assigned to a divided region.

The total number of regions is a total number of divided regions in the mosaic image. The initial value of the total number of regions is the number of basic division of the original image corresponding to the mosaic image ID. Each time a basic region is divided into child regions, the total number of regions is incremented. The number of pieces of assigned image information to be registered is equal to the number of basic division of the original image. Each assigned image information is registered in association with an index of a corresponding basic region.

FIGS. 7B and 7C are diagrams illustrating an example of content included in the assigned image information. As illustrated in FIGS. 7B and 7C, a division flag is included in the assigned image information. The division flag indicates whether or not the basic region (X1, Y1) is divided. When the division flag is set to OFF, it indicates that the corresponding basic region is not divided. When the division flag is set to ON, it indicates that the corresponding basic region is divided.

As illustrated in FIG. 7B, in the assigned image information of which division flag is set to OFF, only one assigned image number is further included.

The assigned image number is an image number of a posted image assigned to a divided region. An assigned image number of a divided region to which a posted image has not yet been assigned is set to an invalid number such as −1. The assigned image number in a case in which the division flag is set to OFF is an image number of a posted image assigned to a basic region.

As illustrated in FIG. 7C, in the assigned image information of which division flag is set to ON, a pattern number and a plurality of assigned image numbers are further included.

The pattern number is a number of a pattern of the number of child division of the basic region (X1, Y1). The assigned image information of which division flag is set to ON is an image number of a posted image assigned to a child region formed by dividing the basic region (X1, Y1). In this case, the number of the assigned image numbers to be registered is equal to the number of child division corresponding to the pattern number. Each assigned image number is registered in association with indexes of corresponding basic region and child region. In this case, the assigned image number (X1, Y1)(Y2, Y2) is an image number of a posted image assigned to the child region (X1, Y1)(Y2, Y2).

The mosaic image display data is data for displaying the mosaic image in a Web page. In other words, the mosaic image display data represents display content of the mosaic image. In the embodiment, the mosaic image is represented as a table in which a posted image is inserted in each cell. For example, the mosaic image display data is data described in a markup language such as HTML (Hyper Text Markup Language), XML (Extensible Markup Language), and XHTML (Extensible Hyper Text Markup Language). The mosaic image display data forms a part of an HTML document of a Web page in which the mosaic image is displayed. The system control unit 14 transmits the HTML document including the mosaic image display data to the user terminal 2, so that the system control unit 14 causes the mosaic image to displayed by the user terminal 2 on the basis of the HTML document. Specifically, the user terminal 2 displays a posted image in each cell of the table according to the description content of the mosaic image display data included in the HTML document, so that the user terminal 2 displays the mosaic image in the Web page. In the embodiment, the user terminal 2 generates (forms) the mosaic image on a screen.

In the mosaic image display data, for example, the table is defined by a table tag, a tr gag, a td tag, and the like. An img tag of, for example, <img src="href="http://www.yyy.zzz/9876543210-0123.jpeg"> is inserted between a td start tag and a td end tag which represent a cell. Here, "http://www.yyy.zzz/9876543210-0123.jpeg" is an URL (Uniform Resource Locator) of the posted image data. "9876543210" is the original image ID. "0123" is the image number of the posted image. In this way, in a cell corresponding to a divided region to which a posted image is assigned, an img tag including the URL of the assigned posted image is inserted. The URL may be a URL of image data of a thumbnail of the posted image. In the mosaic image, normally, a posted image is displayed in a size smaller than the original display size. Therefore, image data of a thumbnail obtained by reducing the numbers of vertical and horizontal pixels of the posted image and reducing the display size may be transmitted to the user terminal 2 which displays the mosaic image. In this case, for example, when the system control unit 14 registers posted image data in the posted image DB 12c, the system control unit 14 generates image data of a thumbnail of the posted image on the basis of the posted image data and registers the image data of the thumbnail in the posted image DB 12c.

Content of the assigned image information registered in the mosaic image DB 12d is reflected on the mosaic image display data. Therefore, in the mosaic image DB 12d, only either one of the assigned image information and the mosaic image display data may be registered. If only the assigned image information is registered, when the system control unit 14 transmits a web page in which the mosaic image is displayed, the system control unit 14 may generate the mosaic image display data based on the assigned image information.

Next, other information stored in the storage unit 12 will be described. A division pattern table is stored in the storage unit 12. FIG. 7D is a diagram illustrating an example of content included in the division pattern table. The division pattern table is table information indicating a pattern of the number of child division. As illustrated in FIG. 7D, in the division pattern table, the number of division patterns and one or more pieces of child division number information are included.

The number of division patterns indicates the number of patterns of the number of child divisions. In the example illustrated in FIGS. 4A, 4B, and 4C, the number of division patterns is three. The number of pieces of child division number information to be included is equal to the number of division patterns. The child division number information is information indicating the number of child division. Specifically, the child division number information includes the number of child division, the number of child horizontal division, and the number of child vertical division. The number of child horizontal division is the number of division in the horizontal direction. Specifically, the number of child horizontal division is the number of child regions in a basic region arranged in the horizontal direction. The number of child vertical division is the number of division in the vertical direction. Specifically, the number of child vertical division is the number of child regions in a basic region arranged in the vertical direction. The number of child division is obtained by multiplying the number of child horizontal division by the number of child vertical division. The index of the number of child division is the pattern number N. Each child division number information is set so that the following relations are satisfied.

The number of child division of child division number information 1>1

The number of child division of child division number information N+1>the number of child division of child division number information N In the example illustrated in FIGS. 4A, 4B, and 4C, the number of child division, the number of child horizontal division, and the number of child vertical division of the child division number information 1 are 4, 2 and 2. Those of the child division number information 2 are 8, 4 and 2. Those of the child division number information 3 are 16, 4 and 4. The number of the representative color values registered in the child region information N registered in the original image DB 12b corresponds to the number of child division included in the child division number information N. The assigned image number included in the assigned image information registered in the mosaic image DB 12d corresponds to the number of child division included in the child division number information corresponding to the pattern number included in the assigned image information.

The number of division patterns and each child division number information are performed by, for example, an administrator of the mosaic image providing server 1 or the like. The number of division patterns may be greater than or equal to 1. The number of child horizontal division and the number of child vertical division need not be the same. The number of child division included in each child division number information need not be a multiple of the number of child division included in the child division number information 1. The child division number information can be arbitrarily set as long as the condition indicated by the above formulas is satisfied. For example, when the number of division patterns is 1, the basic region is divided by only one pattern of the number of child division. When the number of division patterns is 2 or more, the basic region may be divided by a plurality of patterns of the number of child divisions.

The storage unit 12 stores various data such as an HTML documents for displaying a web pages, XML documents, image data, text data, and electronic documents. Also, the storage unit 12 stores various setting values set by the administrator or the like. The setting values include a threshold value to determine whether or not the color of the posted image is similar to a color of a divided region and a division permission unassigned region number (an example of a preset number of the present invention), which indicates the number of unassigned regions, for determining whether or not unassigned regions may be divided.

Also, the storage unit 12 stores various programs such as an operating system, a WWW (World Wide Web) server program, a DBMS (DataBase Management System), and a mosaic image providing program. The mosaic image providing program is a program for performing processes related to the mosaic image such as registering the original image, acquiring a posted image, generating the mosaic image display data. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14a, a ROM (Read Only Memory) 14b, a RAM (Random Access Memory) 14c, and the like. In the system control unit 14, the CPU 14a reads and executes various programs, so that the system control unit 14 functions as an acquisition means, a first search means, a first assignment means, a dividing means, a second assignment means, a presentation means, a second search means, and a color information generation means of the present invention.

The mosaic image providing server 1 may include a plurality of server devices. For example, a server device that performs processes related to registering the original image, acquiring a posted image, and generating the mosaic image display data, a server device that transmits a Web page in response to a request from the user terminal 2, a server device that manages databases, and the like may be connected to each other by a LAN or the like.

3. Operation of Mosaic Image Providing System

Next, an operation of the mosaic image providing system S will be described with reference to FIGS. 8 to 13.

Figure 8:
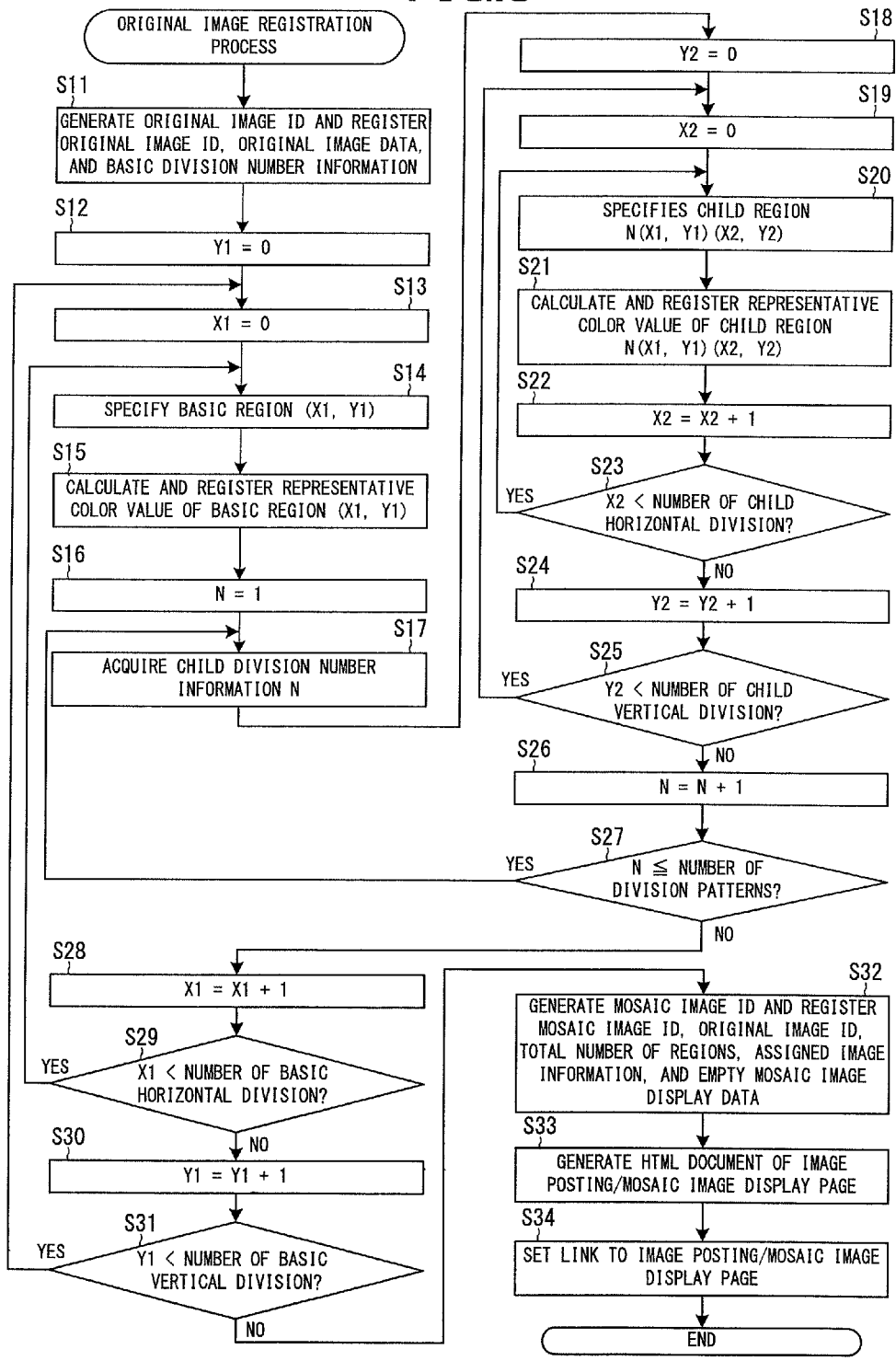
FIG. 8 is a flowchart showing a process example of an original image registration process of a system control unit 14 of the mosaic image providing server 1 according to the embodiment.

FIG. 8 is a flowchart showing a process example of an original image registration process of the system control unit 14 of the mosaic image providing server 1 according to the embodiment.

For example, an administrator of the mosaic image providing server 1 registers the original image by operating a management terminal device connected to the mosaic image providing server 1. Specifically, the administrator selects the original image and inputs the number of basic horizontal division and the number of basic vertical division. Then, the management terminal device transmits an original image registration request including the original image, the number of basic horizontal division, and the number of basic vertical division to the mosaic image providing server 1. For example, also a user may post the original image. In this case, the user terminal 2 of the user who posts the original image transmits the original image registration request.

The original image registration process is started when the mosaic image providing server 1 receives the original image registration request. The original image registration process is previously performed before a posted image reception process described later. After the original image registration process is performed, assignment of a posted image and the like in the posted image reception process can be performed.

In the original image registration process, the system control unit 14 generates a new original image ID. Next, the system control unit 14 generates the basic division number information based on the number of basic horizontal division and the number of basic vertical division included in the received original image registration request. Then, the system control unit 14 registers the new original image ID, the original image data included in the original image registration request, and the generated basic division number information into the original image DB 12$b$ in association with each other (step S11). The system control unit 14 puts a bitmap image of the original image in the RAM 14$c$ on the basis of the original image data.

Next, the system control unit 14 divides the original image into a plurality of basic regions. First, the system control unit 14 sets the index Y1 of the basic region to 0 (step S12). Next, the system control unit 14 sets the index X1 of the basic region to 0 (step S13). Next, the system control unit 14 specifies the basic region (X1, Y1) (step S14). Specifically, the system control unit 14 acquires the numbers of vertical and horizontal pixels of the original image from the registered original image data. Next, the system control unit 14 calculates a coordinate range of the pixels included in the basic region (X1, Y1) based on the numbers of vertical and horizontal pixels of the original image and the number of basic horizontal division and the number of basic vertical division indicated by the registered basic division number information.

Next, the system control unit 14 calculates the representative color value of the basic region (X1, Y1) (step S15). For example, the system control unit 14 acquires values of the pixels included in the basic region (X1, Y1) from a bitmap image of the original image which is put in the RAM 14$c$. Next, the system control unit 14 sums up the acquired pixel values for each basic color R, G, and B. Next, the system control unit 14 divides the sum of the pixel values by a total number of pixels included in the basic region (X1, Y1) for each basic color. The average of the pixel values obtained by the above calculation for each basic color is the representative color value. Next, the system control unit 14 registers the calculated representative color value into the original image DB 12$b$ in association with a new original image ID and the indexes X1 and Y1 of the basic region.

Next, the system control unit 14 sets the pattern number N to 1 (step S16). Next, the system control unit 14 acquires the child division number information N from the division pattern table (step S17).

Next, the system control unit 14 sets the index Y2 of the child region to 0 (step S18). Next, the system control unit 14 sets the index X2 of the child region to 0 (step S19). Next, the system control unit 14 specifies the child region N(X1, Y1) (X2, Y2) (step S20). The child region N(X1, Y1)(X2, Y2) is a child region formed when the basic region is tentatively divided by the number of child division corresponding to the pattern number N. Specifically, the system control unit 14 calculates a coordinate range of pixels included in the child region N(X1, Y1)(X2, Y2) based on the numbers of vertical and horizontal pixels of the original image, the number of basic horizontal division and the number of basic vertical division included in the registered basic division number information, the number of child horizontal division and the number of child vertical division included in the child division number information N, and the indexes X1, Y1, X2 and Y2.

Next, as the color information generation means, the system control unit 14 calculates the representative color value of the child region N(X1, Y1)(X2, Y2) (step S21). This calculation method is the same as that in the case of the basic region. The system control unit 14 registers the calculated representative color value into the original image DB 12$b$ in association with a new original image ID, the pattern number N, and the indexes X1, Y1, X2 and Y2.

Next, the system control unit 14 adds 1 to the index X2 (step S22). Next, the system control unit 14 determines whether or not the index X2 is smaller than the number of child horizontal division (step S23). At this time, if the system control unit 14 determines that the index X2 is smaller than the number of child horizontal division (YES in step S23), the system control unit 14 proceeds to step S20. On the other hand, if the system control unit 14 determines that the index X2 is not smaller than the number of child horizontal division (NO in step S23), the system control unit 14 adds 1 to the index Y2 (step S24). Next, the system control unit 14 determines whether or not the index Y2 is smaller than the number of child vertical division (step S25). At this time, if the system control unit 14 determines that the index Y2 is smaller than the number of child vertical division (YES in step S25), the system control unit 14 proceeds to step S19. The system control unit 14 repeats the processes from step S19 to step S25, so that the system control unit 14 registers the representative color value of each child region obtained by dividing the basic region (X1, Y1) by the number of child division corresponding to the pattern number N.

If the system control unit 14 determines that the index Y2 is not smaller than the number of child vertical division (NO in step S25), the system control unit 14 adds 1 to the pattern number N (step S26). Next, the system control unit 14 determines whether or not the pattern number N is smaller than or equal to the number of division patterns included in the division pattern table (step S27). At this time, if the system control unit 14 determines that the pattern number N is smaller than or equal to the number of division patterns (YES in step S27), the system control unit 14 proceeds to step S17. The system control unit 14 repeats the processes from step S17 to step S27, so that the system control unit 14 registers the representative color value of each child region obtained by dividing the basic region (X1, Y1) by the number of child divisions of all the patterns.

If the system control unit 14 determines that the pattern number N is not smaller than or equal to the number of division patterns (NO in step S27), the system control unit 14 adds 1 to the index X1 (step S28). Next, the system control unit 14 determines whether or not the index X1 is smaller than the number of basic horizontal division (step S29). At this time, if the system control unit 14 determines that the index X1 is smaller than the number of basic horizontal division (YES in step S29), the system control unit 14 proceeds to step S14. On the other hand, if the system control unit 14 determines that the index X1 is not smaller than the number of basic horizontal division (NO in step S29), the system control unit 14 adds 1 to the index Y1 (step S30). Next, the system control unit 14 determines whether or not the index Y1 is smaller than the number of basic vertical division (step S31). At this time, if the system control unit 14 determines that the index Y1 is smaller than the number of basic vertical division (YES in step S31), the system control unit 14 proceeds to step S13. The system control unit 14 repeats the processes from step S13 to step S31, so that the system control unit 14 registers the representative color values of all the basic regions and also registers the representative color value of each child region obtained by dividing all the basic regions by the number of child divisions of all the patterns.

If the system control unit 14 determines that the index Y1 is not smaller than the number of basic vertical division (NO in step S31), the system control unit 14 generates a new mosaic image ID. Next, the system control unit 14 registers the new mosaic image ID and the original image ID into the mosaic image DB 12*d* in association with each other. Also, the system control unit 14 registers the number of basic division included in the registered basic vertical division number information as a total number of regions into the mosaic image DB 12*d* in association with the new mosaic image ID and the original image ID. Also, the system control unit 14 registers the assigned image information, as the assigned image information of each basic region, including a division flag set to off and including an assigned image number indicating that a posted image is not assigned into the mosaic image DB 12*d* in association with the new mosaic image ID and the original image ID. Also, the system control unit 14 registers empty mosaic image display data into the mosaic image DB 12*d* in association with the new mosaic image ID and the original image ID (step S32). The empty mosaic image display data is mosaic image display data in which an img tag including the URL of the posted image data is not included at all.

Next, the system control unit 14 generates an HTML document of an image posting/mosaic image display page 400 (step S33). The image posting/mosaic image display page 400 is a Web page from which an image is posted and on which a mosaic image is displayed. The system control unit 14 causes the storage unit 12 to store the generated HTML document. Next, the system control unit 14 sets a hyper link to the generated HTML document (step S34). For example, the system control unit 14 adds the a tag including the URL of the HTML document of the image posting/mosaic image display page 400 to the HTML document of the top page of the Web site of the mosaic image providing system S. Thereby, an image can be posted by a user and the mosaic image can be browsed by the user. When the system control unit 14 completes the process of step S34, the system control unit 14 ends the original image registration process.

Figure 9:
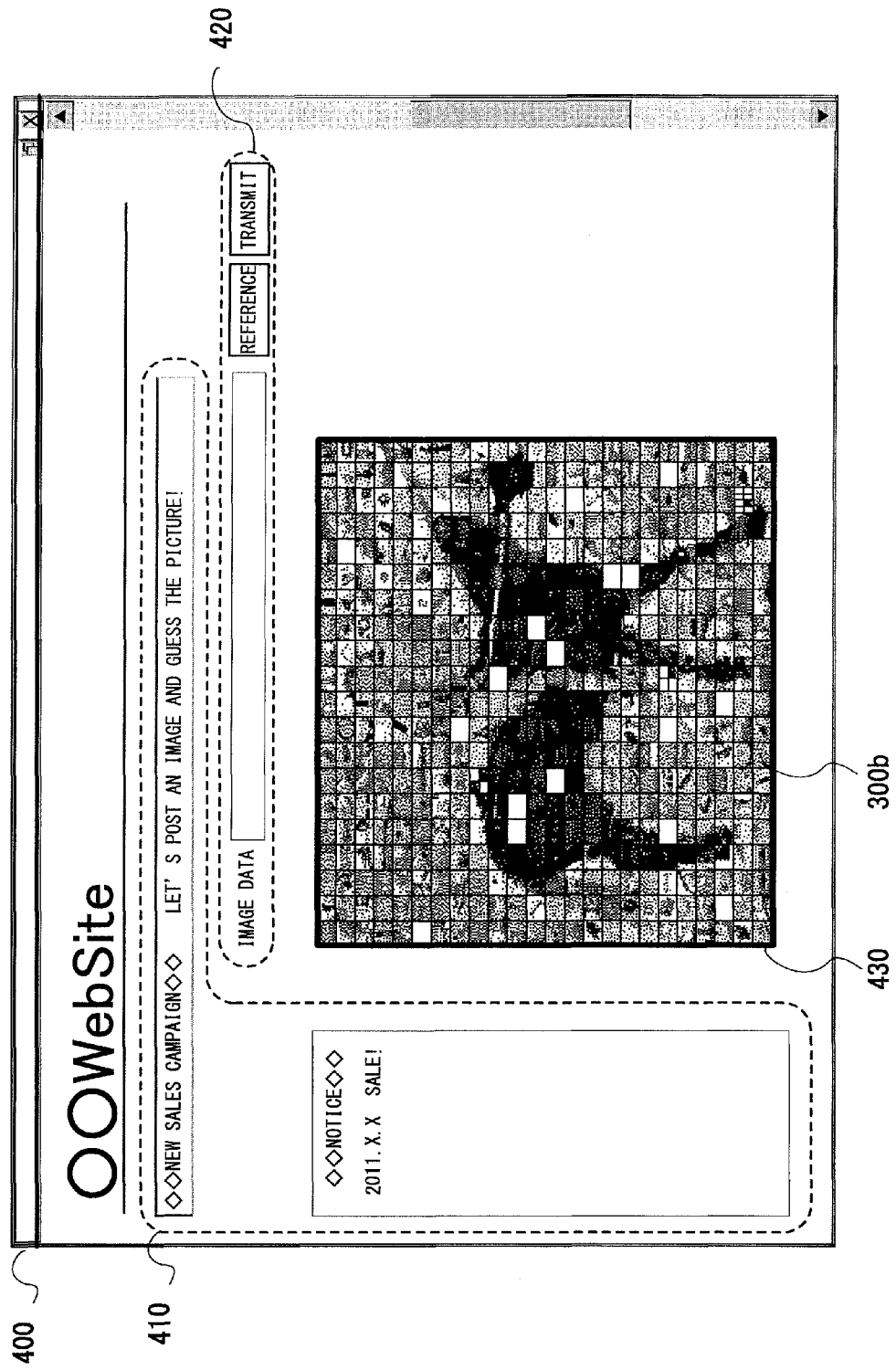
FIG. 9 is a diagram showing a screen display example of an image posting/mosaic image display page 400 according to the embodiment.

FIG. 9 is a diagram showing a screen display example of the image posting/mosaic image display page 400 according to the embodiment. As shown in FIG. 9, the image posting/mosaic image display page 400 includes a message portion 410, a posted image transmission portion 420, a mosaic image display portion 430, and the like. In the message portion 410, for example, information such as a notice related to an item for sale, a service, and the like in a site related to the mosaic image providing system S is displayed. In the posted image transmission portion 420, various widgets (operation elements) for posting an image are displayed. For example, an input field for specifying a path name of the posted image data, a reference button for displaying a dialog for selecting posted image data from the image data stored in the user terminal 2, a transmission button for transmitting the posted image data, and the like are displayed. In the mosaic image display portion 430, a mosaic image generated by images posted so far is displayed. In FIG. 9, a mosaic image 300*b* is displayed as an example the mosaic image. The mosaic image 300*b* is a mosaic image generated by assigning posted images to a part of the divided regions. If no image is posted after the original image registration process is completed, no mosaic image is displayed in a mosaic image display portion 430.

When any one of the posted images included in the mosaic image displayed in the mosaic image display portion 430 is selected by a user, for example, the selected posted image may be enlarged and displayed in the image posting/mosaic image display page 400 or information related to a user who posted the selected posted image (for example, a nickname and a profile of the user) may be displayed in the image posting/mosaic image display page 400. When displaying the information related to a user who posted the selected posted image, for example, the system control unit 14 inserts the user ID of the user who posted the selected posted image into the mosaic image display data when inserting the img tag into the mosaic image display data. When a user selects any one of the posted images in the mosaic image display portion 430, the user terminal 2 transmits a request including the user ID of the user who posted the selected posted image. The request is transmitted to the mosaic image providing server 1. The system control unit 14 acquires necessary information from user information corresponding to the user ID included in the received request and transmits the information to the user terminal 2. Then, the user terminal 2 displays the received information.

Figure 10:
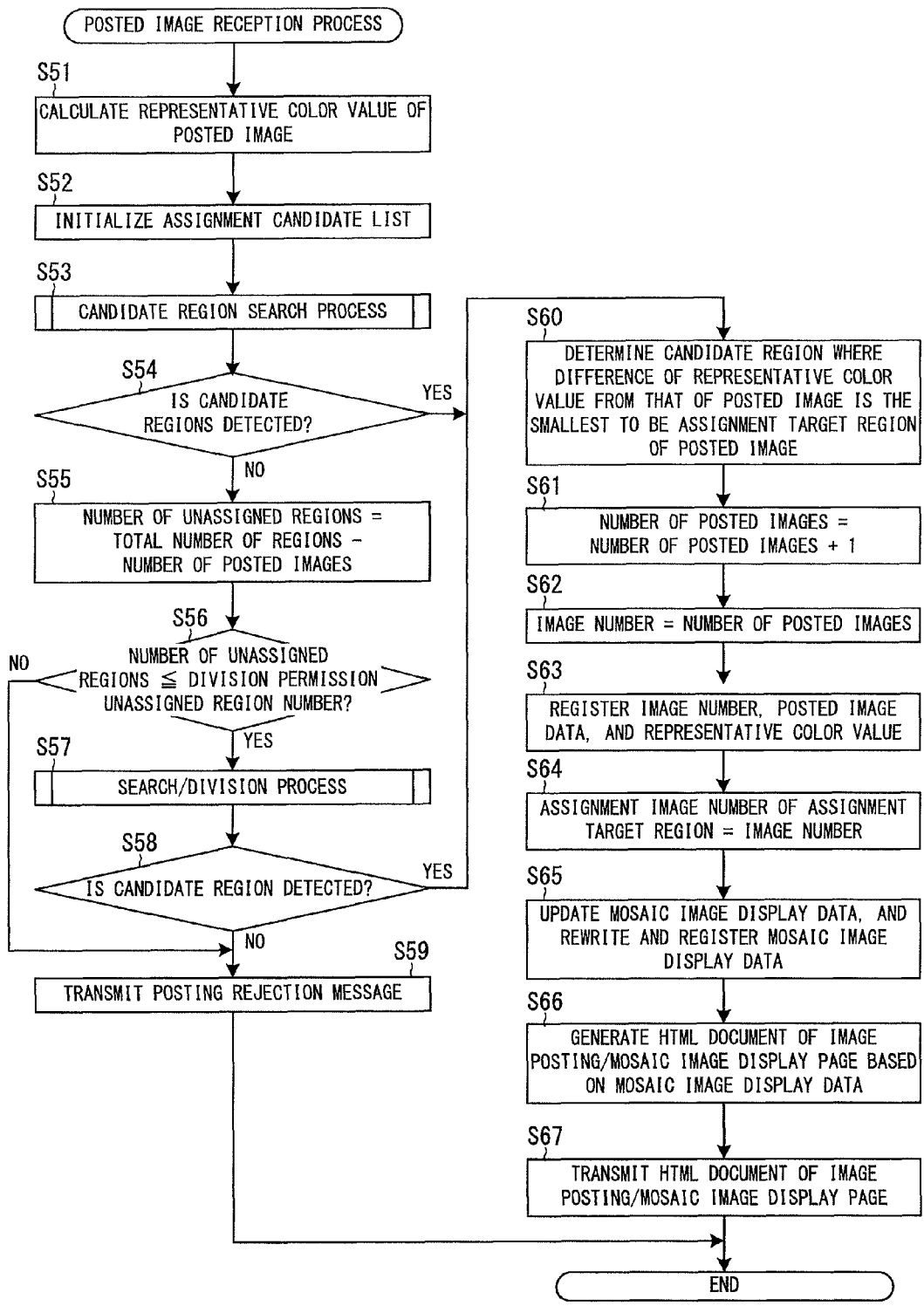
FIG. 10 is a flowchart showing a process example of a posted image reception process of the system control unit 14 of the mosaic image providing server 1 according to the embodiment.

FIG. 10 is a flowchart showing a process example of the posted image reception process of the system control unit 14 of the mosaic image providing server 1 according to the embodiment. When a user specifies posted image data and selects the transmission button in the posted image transmission portion 420 in the image posting/mosaic image display page 400, the user terminal 2 transmits a posting request to the mosaic image providing server 1. The posting request includes the specified posted image data, the user ID of the user who performed the operation, and the mosaic image ID of the mosaic image to be generated. The posted image reception process is started when the mosaic image providing server 1, as the acquisition means, receives the posting request.

First, the system control unit 14 calculates the representative color value of the posted image (hereinafter referred to as a "posted image to be processed") indicated by the posted image data included in the posting request (step S51). This calculation method is the same as that in step S15 in the original image registration process.

Here, the system control unit 14 performs exclusive control using, for example, mutex or the like, and when acquiring a right to perform a process of step S52 and the following processes (critical session), the system control unit 14 performs a lock operation. Thereby, the system control unit 14 prevents a plurality of processes from performing a critical session at the same time.

Next, the system control unit 14 initializes an assignment candidate list and puts the assignment candidate list in the RAM 14*c* (step S52). The assignment candidate list is a list of divided regions (hereinafter referred to as "candidate regions") that satisfy the conditions where the posted image to be processed can be assigned. The candidate region is a region where the difference of the representative color value from that of the posted image to be processed is smaller than or equal to a threshold value. In the assignment candidate list, an index of a candidate region and a value of the difference of the representative color value between the candidate region and the posted image to be processed are registered in association with each other.

Next, as the first search means, the system control unit 14 performs a candidate region search process described later (step S53). In the candidate region search process, candidate regions are searched for from unassigned regions and detected candidate regions are registered in the assignment candidate list.

Next, the system control unit 14 determines whether or not candidate regions can be detected (step S54). Specifically, the system control unit 14 determines whether or not one or more sets of the index and the value of the difference of a candidate region are registered in the assignment candidate list. At this time, if the index and the value of the difference of a candidate region are not registered in the assignment candidate list, the system control unit 14 determines that no candidate region can be detected (NO in step S54). In this case, the system control unit 14 acquires the total number of regions which is registered in the mosaic image DB 12*d* in association with the mosaic image ID (hereinafter referred to as a "target mosaic image ID") included in the posting request. Next, the system control unit 14 acquires the number of posted images which is registered in the posted image DB 12*c* in association with the target mosaic image ID. Next, the system control unit 14 calculates the number of unassigned regions by subtracting the number of posted images from the total number of regions (step S55).

Next, as the determination means, the system control unit 14 determines whether or not the number of unassigned regions is smaller than or equal to the division permission unassigned region number stored in the storage unit 12 (step S56). At this time, if the system control unit 14 determines that the number of unassigned regions is not smaller than or equal to the division permission unassigned region number (NO in step S56), the system control unit 14 transmits a posting rejection message to the user terminal 2 which is the transmission source of the posting request (step S59). The posting rejection message is a message indicating that the posting of the image is rejected. The user terminal 2 displays the received posting rejection message on a screen. When the system control unit 14 completes the process of step S59, the system control unit 14 ends the posted image reception process.

On the other hand, if the system control unit 14 determines that the number of unassigned regions is smaller than or equal to the division permission unassigned region number (YES in step S56), as the second search means, the system control unit 14 performs a search/division process described later (step S57). In the candidate region search process, candidate regions are searched for from child regions formed if an unassigned region is divided. If the candidate regions are detected, the unassigned region including the candidate regions is actually divided and the candidate regions are registered in the assignment candidate list.

Next, the system control unit 14 determines whether or not candidate regions can be detected (step S58). Specifically, the system control unit 14 determines whether or not the index and the value of the difference of a candidate region are registered in the assignment candidate list. At this time, if the index and the value of the difference of a candidate region are not registered in the assignment candidate list, the system control unit 14 determines that no candidate region can be detected (NO in step S58). In this case, the system control unit 14 transmits a posting rejection message (step S59) and ends the posted image reception process.

In step S54 or step S58, if the index and the value of the difference of a candidate region are registered in the assignment candidate list, the system control unit 14 determines that a candidate region can be detected (YES in step S54 or YES in step S58). In this case, the system control unit 14 determines a candidate region where the difference of the representative color value from that of the posted image to be processed is the smallest among the detected candidate regions to be a divided region (hereinafter referred to as an "assignment target region") to which the posted image to be processed is assigned (step S60). Specifically, the system control unit 14 searches for the smallest value from the values of the differences registered in the assignment candidate list. Then, the system control unit 14 acquires the indexes X1 and Y1 or the indexes X1, Y1, X2 and Y2 associated with the smallest value of the difference as the indexes of the assignment target region from the assignment candidate list. When the indexes of the assignment target region are only X1 and Y1, the assignment target region is a basic region. On the other hand, when the indexes of the assignment target region are X1, Y1, X2 and Y2, the assignment target region is a child region. In the search/division process, only one candidate region is searched for at most. Therefore, the candidate region detected in the search/division process directly becomes the assignment target region.

Next, the system control unit 14 updates the number of posted images by adding 1 to the number of posted images registered in the posted image DB 12*c* in association with the target mosaic image ID (step S61). Next, the system control unit 14 sets the image number of the posted image to be processed to the updated number of posted images (step S62). Next, the system control unit 14 registers the image number, the user ID and the posted image data included in the posting request, and the posted image information including the representative color value of the posted image to be processed into the posted image DB 12*c* in association with the target mosaic image ID (step S63).

Next, as the first assignment means and the second assignment means, the system control unit 14 rewrites the assignment image number of the assignment target region registered in the mosaic image DB 12*d* in association with the target mosaic image ID and the indexes of the assignment target region to the image number of the posted image to be processed (step S64).

Next, the system control unit 14 updates the mosaic image display data registered in the mosaic image DB 12*d* in association with the target mosaic image ID (step S65). Specifically, in the mosaic image display data, the system control unit 14 inserts an img tag including the URL of the posted image data of the posted image to be processed into a cell corresponding to the indexes of the assignment target region. Here, if the assignment target region is detected in the search/division process, a basic region is divided. Therefore, the system control unit 14 updates the mosaic image display data so that a cell corresponding to the divided basic region is divided into a plurality of cells. Specifically, the system control unit 14 acquires a pattern number from the assigned image information registered in the mosaic image DB 12*d* in association with the mosaic image ID and the indexes of the assignment target region X1 and Y1. Next, the system control unit 14 acquires the child division number information corresponding to the pattern number from the division pattern table. Next, the system control unit 14 divides the cell corresponding to the basic region (X1, Y1) by the number of child horizontal division and the number of child vertical division included in the child division number information.

Next, the system control unit 14 generates an HTML document of the image posting/mosaic image display page 400 including the updated mosaic image display data and stores the HTML document into the storage unit 12 (step S66). Next, the system control unit 14 transmits the generated HTML document to the user terminal 2 that is the transmission source of the posting request (step S67). Here, the system control unit 14 performs an unlock operation to allow other processes to perform the critical session. When the system control unit 14 completes this process, the system control unit 14 ends the posted image reception process.

The user terminal 2 displays the image posting/mosaic image display page 400 on a screen based on the received HTML document. At this time, the system control unit 14 transmits a request including the URL of the posted image data to the mosaic image providing server 1 based on the img tag included in the mosaic image display data. The system control unit 14 acquires the mosaic image ID and the image number from the URL included in the received request. Next, the system control unit 14 acquires the posted image data corresponding to the acquired mosaic image ID and the image number from the posted image DB 12*c*. Next, the system control unit 14 transmits the acquired posted image data to the user terminal 2. The user terminal 2 displays the posted image in the mosaic image display portion 430 in the image posting/mosaic image display page 400 based on the acquired posted image data. Thereby, for example, the mosaic image as illustrated in FIG. 9 is displayed. In this way, the system control unit 14 transmits the mosaic image display data, so that, as the presentation means, the system control unit 14 causes the mosaic image to be presented to the user by the user terminal 2.

Figure 11:
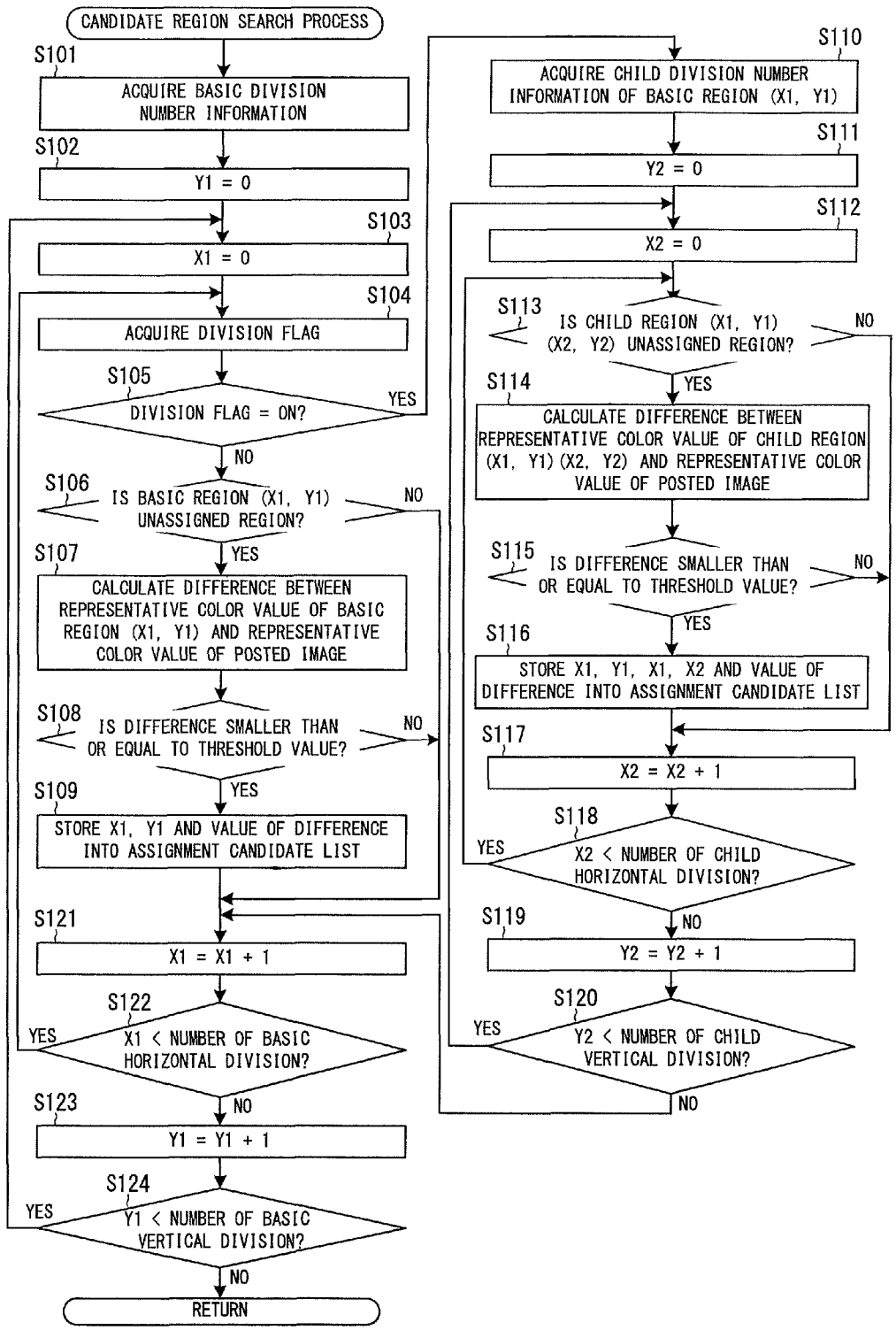
FIG. 11 is a flowchart showing a process example of a candidate region search process of the system control unit 14 of the mosaic image providing server 1 according to the embodiment.

FIG. 11 is a flowchart illustrating a process example of the candidate region search process of the system control unit 14 of the mosaic image providing server 1 according to the embodiment.

First, the system control unit 14 acquires an original image ID (hereinafter referred to as a "target original image ID") corresponding to the target mosaic image ID from the mosaic image DB 12*d*. Next, the system control unit 14 acquires the basic division number information corresponding to the target original image ID from the original image DB 12*b* (step S101).

Next, the system control unit 14 sets the index Y1 of the basic region to 0 (step S102). Next, the system control unit 14 sets the index X1 of the basic region to 0 (step S103). Next, the system control unit 14 acquires the division flag from the assigned image information (X1, Y1) registered in the mosaic image DB 12*d* in association with the target mosaic image ID (step S104). Next, the system control unit 14 determines whether or not the division flag is set to ON (step S105).

At this time, if the system control unit 14 determines that the division flag is not set to ON (NO in step S105), the system control unit 14 determines that the basic region (X1, Y1) is not divided. Therefore, the system control unit 14 determines whether or not the basic region (X1, Y1) is an unassigned region (step S106). Specifically, the system control unit 14 determines whether or not the assigned image number (X1, Y1) registered in the mosaic image DB 12*d* in association with the target mosaic image ID is a number that indicates an unassigned region.

At this time, if the assigned image number (X1, Y1) is a number that indicates an unassigned region, the system control unit 14 determines that the basic region (X1, Y1) is an unassigned region (YES in step S106). In this case, the system control unit 14 calculates a difference between the representative color value of the basic region (X1, Y1) and the representative color value of the posted image to be processed (step S107). Specifically, the system control unit 14 acquires the representative color value (X1, Y1) registered in the original image DB 12*b* in association with the target original image ID. Next, the system control unit 14 calculates the difference by the following formula 1.

$$\text{Diff} = (R_1 - R_2)^2 + (G_1 - G_2)^2 + (B_1 - B_2)^2 \quad \text{[Formula 1]}$$

In the formula 1, Diff is the difference. R1, G1, and B1 are representative color values of R, G, and B in the basic region (X1, Y1). R2, G2, and B2 are representative color values of R, G, and B in the posted image to be processed. The system control unit 14 may calculate absolute values of the difference calculated for each basic color and sum up the absolute values instead of calculating squares of the difference calculated for each basic color and summing up the calculation results.

Next, the system control unit 14 determines whether or not the calculated value of the difference is smaller than or equal to a threshold value (step S108). At this time, if the system control unit 14 determines that the value of the difference is smaller than or equal to the threshold value (YES in step S108), the system control unit 14 determines the basic region (X1, Y1) to be a candidate region (step S109). Specifically, the system control unit 14 stores the indexes X1 and Y1 and the calculated value of the difference into the assignment candidate list in association with each other. Then, the system control unit 14 proceeds to step S121.

In step S106, if the assigned image number (X1, Y1) is not a number that indicates an unassigned region, the system control unit 14 determines that the basic region (X1, Y1) is not an unassigned region (NO in step S106). In this case, the system control unit 14 proceeds to step S121. In step S108, if the system control unit 14 determines that the value of the difference is not smaller than or equal to the threshold value (NO in step S108), the system control unit 14 also proceeds to step S121.

In step S105, if the system control unit 14 determines that the division flag is set to ON (YES in step S105), the system control unit 14 determines that the basic region (X1, Y1) is divided. Therefore, the system control unit 14 acquires the pattern number N from the assigned image information (X1, Y1) registered in association with the target mosaic ID. Next, the system control unit 14 acquires the child division number information N from the division pattern table (step S110).

Next, the system control unit 14 sets the index Y2 of the child region to 0 (step S111). Next, the system control unit 14 sets the index X2 of the child region to 0 (step S112).

Next, the system control unit 14 determines whether or not the child region (X1, Y1)(X2, Y2) is an unassigned region (step S113). Specifically, the system control unit 14 determines whether or not the assigned image number (X1, Y1)(X2, Y2) registered in the mosaic image DB 12*d* in association with the target mosaic image ID is a number that indicates an unassigned region.

At this time, if the assigned image number (X1, Y1)(X2, Y2) is a number that indicates an unassigned region, the system control unit 14 determines that the child region (X1, Y1)(X2, Y2) is an unassigned region (YES in step S113). In this case, the system control unit 14 calculates a difference between the representative color value of the child region (X1, Y1)(X2, Y2) and the representative color value of the posted image to be processed (step S114). Specifically, the system control unit 14 acquires the representative color value N(X1, Y1)(X2, Y2) registered in the original image DB 12b in association with the target original image ID. Then, the system control unit 14 calculates the difference in the same manner as in step S107 by using the acquired representative color value of the child region.

Next, the system control unit 14 determines whether or not the calculated value of the difference is smaller than or equal to the threshold value (step S115). At this time, if the system control unit 14 determines that the value of the difference is smaller than or equal to the threshold value (YES in step S115), the system control unit 14 determines the child region (X1, Y1)(X2, Y2) to be a candidate region (step S116). Specifically, the system control unit 14 stores the indexes X1, Y1, X2, and Y2 and the calculated value of the difference into the assignment candidate list in association with each other. Then, the system control unit 14 proceeds to step S117.

In step S113, if the assigned image number (X1, Y1)(X2, Y2) is not a number that indicates an unassigned region, the system control unit 14 determines that the child region (X1, Y1)(X2, Y2) is not an unassigned region (NO in step S113). In this case, the system control unit 14 proceeds to step S117. In step S115, if the system control unit 14 determines that the value of the difference is not smaller than or equal to the threshold value (NO in step S115), the system control unit 14 also proceeds to step S117.

In step S117, the system control unit 14 adds 1 to the index X2. Next, the system control unit 14 determines whether or not the index X2 is smaller than the number of child horizontal division included in the acquired child division number information (step S118). At this time, if the system control unit 14 determines that the index X2 is smaller than the number of child horizontal division (YES in step S118), the system control unit 14 proceeds to step S113. On the other hand, if the system control unit 14 determines that the index X2 is not smaller than the number of child horizontal division (NO in step S118), the system control unit 14 adds 1 to the index Y2 (step S119). Next, the system control unit 14 determines whether or not the index Y2 is smaller than the number of child vertical division included in the acquired child division number information (step S120). At this time, if the system control unit 14 determines that the index Y2 is smaller than the number of child vertical division (YES in step S120), the system control unit 14 proceeds to step S112. The system control unit 14 repeats the process from step S112 to step S120, so that the system control unit 14 searches for candidate regions from each child region included in the basic region (X1, Y1). If the system control unit 14 determines that the index Y2 is not smaller than the number of child vertical division (NO n step S120), the system control unit 14 proceeds to step S121.

In step S121, the system control unit 14 adds 1 to the index X1. Next, the system control unit 14 determines whether or not the index X1 is smaller than the number of basic horizontal division included in the acquired basic division number information (step S122). At this time, if the system control unit 14 determines that the index X1 is smaller than the number of basic horizontal division (YES in step S122), the system control unit 14 proceeds to step S104. On the other hand, if the system control unit 14 determines that the index X1 is not smaller than the number of basic horizontal division (NO in step S122), the system control unit 14 adds 1 to the index Y1 (step S123). Next, the system control unit 14 determines whether or not the index Y1 is smaller than the number of basic vertical division included in the acquired basic division number information (step S124). At this time, if the system control unit 14 determines that the index Y1 is smaller than the number of basic vertical division (YES in step S124), the system control unit 14 proceeds to step S103. The system control unit 14 repeats the process from step S103 to step S124, so that the system control unit 14 searches for candidate regions from all the unassigned regions.

If the system control unit 14 determines that the index Y1 is not smaller than the number of basic vertical division (NO in step S124), the system control unit 14 ends the candidate region search process.

Figure 12:
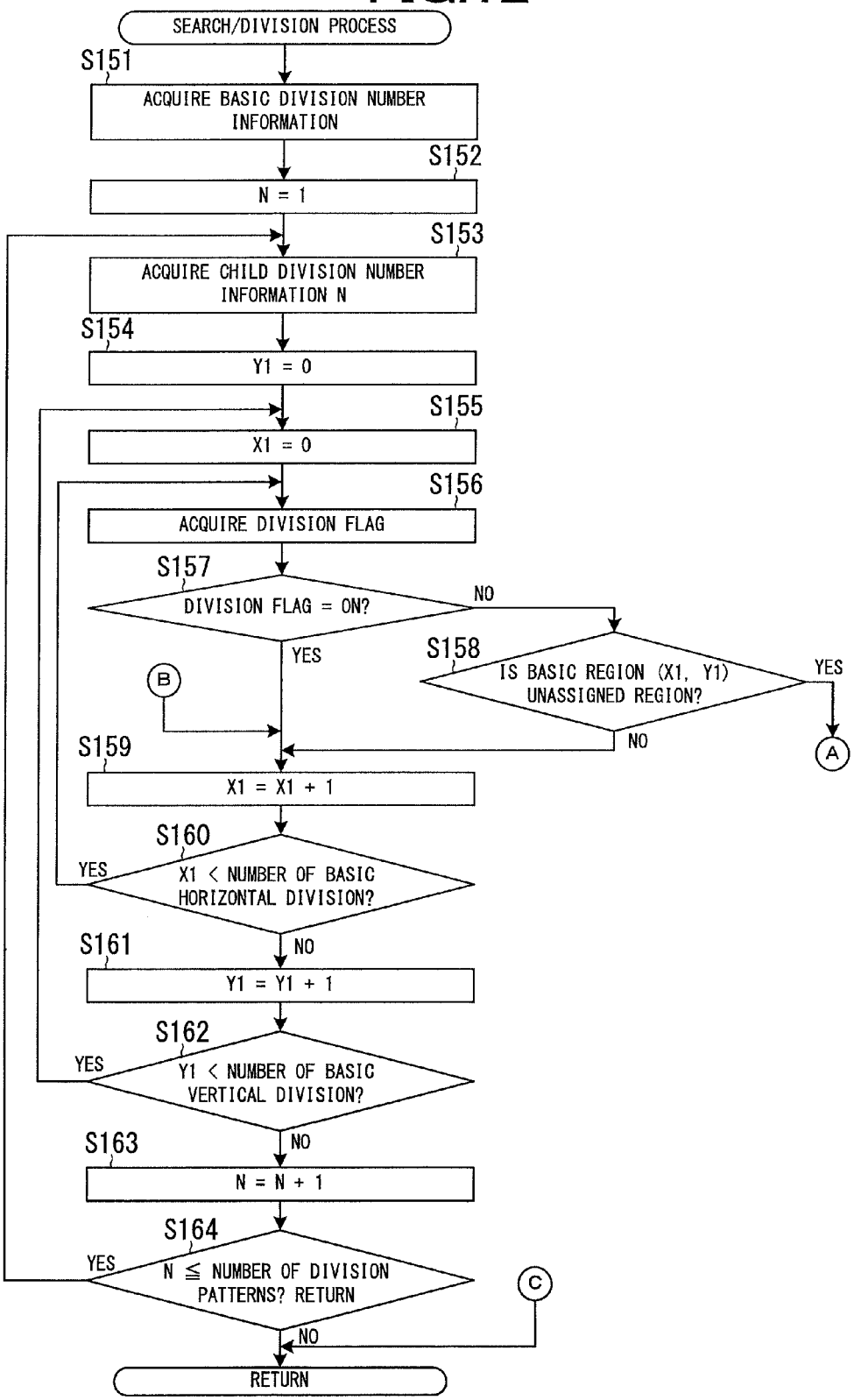
FIG. 12 is a flowchart showing a process example of a search/division process of the system control unit 14 of the mosaic image providing server 1 according to the embodiment.
Figure 13:
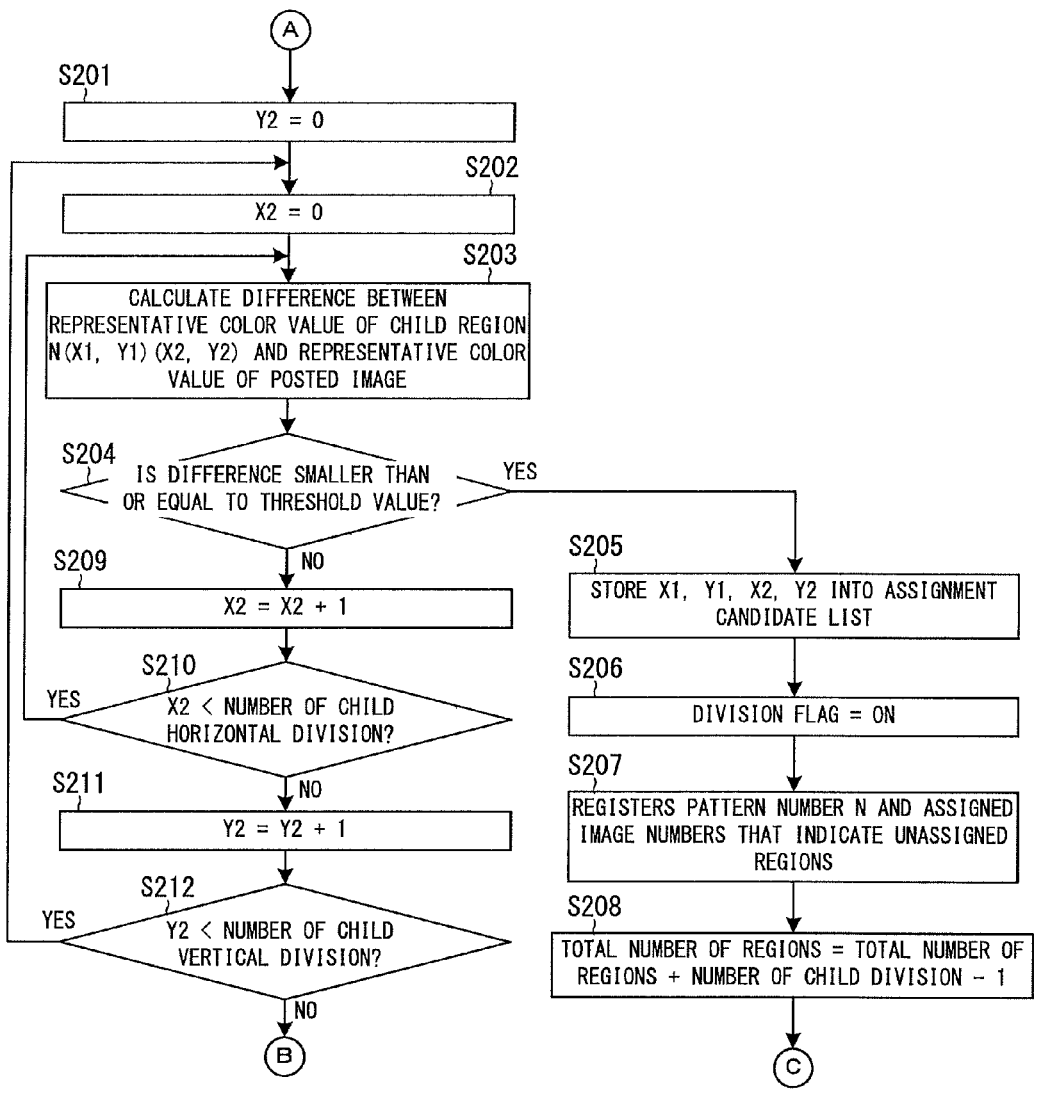
FIG. 13 is a flowchart showing the process example of the search/division process of the system control unit 14 of the mosaic image providing server 1 according to the embodiment.

FIGS. 12 and 13 are flowcharts illustrating the process example of the search/division process of the system control unit 14 of the mosaic image providing server 1 according to the embodiment.

As illustrated in FIG. 12, the system control unit 14 acquires the basic division number information corresponding to the target original image ID from the original image DB 12b (step S151). Next, the system control unit 14 sets the pattern number N to 1 (step S152). Next, the system control unit 14 acquires the child division number information N from the division pattern table (step S153). Next, the system control unit 14 sets the index Y1 of the basic region to 0 (step S154). Next, the system control unit 14 sets the index X1 of the basic region to 0 (step S155). Next, the system control unit 14 acquires the division flag from the assigned image information (X1, Y1) registered in the mosaic image DB 12d in association with the target mosaic image ID (step S156). Next, the system control unit 14 determines whether or not the division flag is set to ON (step S157).

At this time, if the system control unit 14 determines that the division flag is set to ON (YES in step S157), the system control unit 14 proceeds to step S159.

On the other hand, if the system control unit 14 determines that the division flag is not set to ON (NO in step S157), the system control unit 14 determines whether or not the basic region (X1, Y1) is an unassigned region (step S158). At this time, if the system control unit 14 determines that the basic region (X1, Y1) is not an unassigned region (NO in step S158), the system control unit 14 proceeds to step S159.

On the other hand, if the system control unit 14 determines that the basic region (X1, Y1) is an unassigned region (YES in step S158), as illustrated in FIG. 13, the system control unit 14 sets the index Y2 of the child region to 0 (step S201). Next, the system control unit 14 sets the index X2 of the child region to 0 (step S202).

Next, the system control unit 14 calculates a difference between the representative color value of the child region N (X1, Y1)(X2, Y2) and the representative color value of the posted image to be processed (step S203). Specifically, the system control unit 14 acquires the representative color value N (X1, Y1)(X2, Y2) registered in the original image DB 12b in association with the target original image ID. Then, the system control unit 14 calculates the difference in the same manner as in step S114 of the candidate region search process by using the acquired representative color value of the child region.

Next, the system control unit 14 determines whether or not the calculated value of the difference is smaller than or equal to a threshold value (step S204). At this time, if the system control unit 14 determines that the value of the difference is smaller than or equal to the threshold value (YES in step S204), the system control unit 14 determines the child region (X1, Y1)(X2, Y2) to be a candidate region (step S205). Specifically, the system control unit 14 stores the indexes X1, Y1, X2, and Y2 and the calculated value of the difference into the assignment candidate list in association with each other.

The child region determined to be a candidate region here directly becomes the assignment target region. Therefore, as the dividing means, the system control unit 14 divides the basic region (X1, Y1) so that the child region N(X1, Y1)(X2, Y2) is created. First, the system control unit 14 changes the division flag included in the assigned image information (X1, Y1) registered in the mosaic image DB 12d in association with the target mosaic image ID to ON (step S206). Next, the system control unit 14 additionally registers the pattern number N into the assigned image information (X1, Y1). Also, the system control unit 14 additionally registers assigned image numbers that indicate unassigned regions into the assigned image information (X1, Y1) (step S207). At this time, the system control unit 14 registers the assigned image numbers that indicate unassigned regions, the number of which is equal to the number of child division included in the acquired child division number information.

Next, the system control unit 14 updates the total number of regions registered in the mosaic image DB 12d in association with the target mosaic image ID (step S208). Specifically, the system control unit 14 performs the following calculation.

The total number of regions=the total number of regions+the number of child division included in the acquired child division number information−1

When the system control unit 14 completes the process of step S208, the system control unit 14 ends the search/division process.

In step S204, if the system control unit 14 determines that the value of the difference is not smaller than or equal to the threshold value (NO in step S204), the system control unit 14 adds 1 to the index X2 (step S209). Next, the system control unit 14 determines whether or not the index X2 is smaller than the number of child horizontal division included in the acquired child division number information (step S210). At this time, if the system control unit 14 determines that the index X2 is smaller than the number of child horizontal division (YES in step S210), the system control unit 14 proceeds to step S203. On the other hand, if the system control unit 14 determines that the index X2 is not smaller than the number of child horizontal division (NO in step S210), the system control unit 14 adds 1 to the index Y2 (step S211). Next, the system control unit 14 determines whether or not the index Y2 is smaller than the number of child vertical division included in the acquired child division number information (step S212). At this time, if the system control unit 14 determines that the index Y2 is smaller than the number of child vertical division (YES in step S212), the system control unit 14 proceeds to step S202. The system control unit 14 repeats the processes from step S202 to step S212, so that the system control unit 14 searches for an assignment target region from child regions formed if the basic region (X1, Y1) is tentatively divided by the number of child division corresponding to the pattern number N. If the system control unit 14 determines that the index Y2 is not smaller than the number of child vertical division (NO in step S212), the system control unit 14 proceeds to step S159.

In step S159 illustrated in FIG. 12, the system control unit 14 adds 1 to the index X1. Next, the system control unit 14 determines whether or not the index X1 is smaller than the number of basic horizontal division included in the acquired basic division number information (step S160). At this time, if the system control unit 14 determines that the index X1 is smaller than the number of basic horizontal division (YES in step S160), the system control unit 14 proceeds to step S156. On the other hand, if the system control unit 14 determines that the index X1 is not smaller than the number of basic horizontal division (NO in step S160), the system control unit 14 adds 1 to the index Y1 (step S161). Next, the system control unit 14 determines whether or not the index Y1 is smaller than the number of basic vertical division included in the acquired basic division number information (step S162). At this time, if the system control unit 14 determines that the index Y1 is smaller than the number of basic vertical division (YES in step S162), the system control unit 14 proceeds to step S155. The system control unit 14 repeats the processes from step S155 to step S162, so that the system control unit 14 searches for an assignment target region from child regions formed if all the basic regions which are unassigned regions are tentatively divided by the number of child division corresponding to the pattern number N.

If the system control unit 14 determines that the index Y1 is not smaller than the number of basic vertical division (NO in step S162), the system control unit 14 adds 1 to the pattern number N (step S163). Next, the system control unit 14 determines whether or not the pattern number N is smaller than or equal to the number of division patterns included in the division pattern table (step S164). At this time, if the system control unit 14 determines that the pattern number N is smaller than or equal to the number of division patterns (YES in step S164), the system control unit 14 proceeds to step S153. The system control unit 14 repeats the processes from step S153 to step S164, so that the system control unit 14 searches for an assignment target region from child regions formed if all the basic regions which are unassigned regions are tentatively divided by the number of child divisions of all the patterns. If the system control unit 14 determines that the pattern number N is not smaller than or equal to the number of division patterns (NO in step S164), the system control unit 14 ends the search/division process.

As described above, according to the embodiment, the system control unit 14 of the mosaic image providing server 1 acquires a posted image specified by a user, searches for a basic region that satisfies conditions where the acquired posted image can be assigned, and assigns the acquired posted image to a basic region that has been searched for. If there is no basic region that satisfies the conditions where the acquired posted image can be assigned, the system control unit 14 of the mosaic image providing server 1 further divides any one of basic regions which are unassigned regions into a plurality of child regions, assigns the acquired posted image to a child region that satisfies conditions where the acquired posted image can be assigned among a plurality of child regions formed by the division, and causes a mosaic image display in which the acquired posted image is placed to be presented to the user based on the assignment of the image.

Therefore, it is possible not to waste the acquired posted image as much as possible.

The system control unit 14 determines whether or not the number of unassigned regions is smaller than or equal to a preset number, and only when the number of unassigned regions is determined to be smaller than or equal to the preset number, the system control unit 14 performs the division.

Therefore, when there are a certain number of unassigned regions and it is possible not to waste the acquired posted image to some extent, the basic region is not divided, so that it is possible to suppress the increase of the number of posted images required to complete the mosaic image.

The system control unit 14 searches for a child region that satisfies the conditions where the posted image can be assigned from a plurality of child regions formed if each basic region which is an unassigned region is divided and divides a basic region in which the detected child region is formed.

The system control unit 14 searches for a child region that satisfies the conditions where the posted image can be assigned from a plurality of child regions formed if a certain basic region to which a posted image has not yet been assigned is divided by each of a plurality of division patterns and divides the certain basic region by a division pattern by which the detected child region is formed.

Therefore, it is possible to increase the probability that a child region that satisfies the conditions where the posted image can be assigned is detected.

The system control unit 14 detects a child region that satisfies the conditions where the posted image can be assigned from a plurality of child regions formed if a certain basic region to which a posted image has not yet been assigned is divided by each of a plurality of the number of child divisions, preferentially determines the smallest number of child division, by which the child region can be detected, as the number of child division used to actually divide the certain basic region, and divides the certain basic region by the determined number of child division.

Therefore, it is possible to increase the probability that a child region that satisfies the conditions where the posted image can be assigned is detected and also it is possible to suppress the increase of the number of posted images required to complete the mosaic image.

The system control unit 14 calculates in advance the representative color value of each child region formed if each basic region is divided, registers each calculated representative color value into the original image DB 12b, and searches for an unassigned region that satisfies the conditions where the posted image can be assigned based on the representative color value of the acquired posted image and the representative color value of the posted image of the basic regions. When there is no region that satisfies the conditions where the posted image can be assigned, the system control unit 14 searches for a child region that satisfies the conditions where the posted image can be assigned from a plurality of child regions, which are formed if a basic region is divided, based on the representative color value of the posted image and the representative color values of the child regions registered in the original image DB 12b.

Therefore, the representative color value of each child region is calculated in advance, so that it is not necessary to generate the representative color value of each child region when searching for a child region that satisfies the conditions where the posted image can be assigned from a plurality of child regions formed if a basic region is divided. Therefore, it is possible to reduce the processing time of the search.

In the embodiment described above, in the original image registration process, the mosaic image providing server 1 calculates in advance the representative color value of each child region formed if each basic region is divided. However, when the mosaic image providing server 1 determines that no divided region that satisfies the conditions where the posted image can be assigned can be detected in step S54 in the posted image reception process, the mosaic image providing server 1 may calculate a necessary representative color value in the search/division process. By doing so, it is not necessary to calculate the representative color values of child regions formed if a basic region to which a posted image has already been assigned is divided. Therefore, it is possible to reduce the amount of calculation of the representative color values. Specifically, for example, if the system control unit 14 determines that the division flag is not set to ON in step S157, the system control unit 14 may calculate the representative color value of each child region formed when dividing the basic region (X1, Y1) by the number of child division corresponding to the pattern number N. Or, when the system control unit 14 calculates the representative color value in step S203, the system control unit 14 may calculate the representative color value of only the child region N(X1, Y1)(X2, Y2). The system control unit 14 registers the calculated representative color values into the original image DB 12b, so that the system control unit 14 need not calculate the representative color value of the child regions of which representative color value has been calculated in the search/division process after that.

In the embodiment described above, the mosaic image providing server 1 divides only the basic regions. However, the mosaic image providing server 1 may further divide a child region into a plurality of regions (hereinafter referred to as "grandchild regions"). For example, when all the basic regions which are unassigned regions have already been divided into child regions and there is no region that satisfies the conditions where the posted image can be assigned among child regions which are unassigned regions, the system control unit 14 may divide any one of the child regions which are unassigned regions into a plurality of grandchild regions and assign the posted image to a grandchild region that satisfies the conditions where the posted image can be assigned. The division method of the child region, the search method of a grandchild region, and the like are basically the same as those in the embodiment described above. The mosaic image providing server 1 may further divide the grandchild region into a plurality of regions.

In the embodiment described above, the mosaic image providing server 1 re-calculates the total number of regions each time dividing a basis region, so that the mosaic image providing server 1 divides the basic region only when the number of unassigned regions is smaller than or equal to the division permission unassigned region number. In this case, after the basic region is divided, the number of unassigned regions may temporarily exceed the division permission unassigned region number. In other words, after the basic region is divided, there may be temporarily a state in which the division cannot be performed. To avoid this situation, once the number of unassigned regions becomes smaller than or equal to the division permission unassigned region number, the division of the basic region may be performed at all times after that.

In the embodiment described above, the mosaic image providing server 1 performs the process for searching for a child region that satisfies the conditions where the posted image can be assigned from child regions which are formed if a basic region is divided in the search/division process until one child region that satisfies the conditions is detected. However, the mosaic image providing server 1 may search for child regions that satisfy the conditions where the posted image can be assigned from all the basic regions which are unassigned regions. Then, the mosaic image providing server 1 may divide, for example, a basic region from which a child region where the difference of the representative color value from that of the posted image is the smallest is formed among the child regions that satisfy the conditions where the posted image can be assigned and assign the posted image to the child region. The mosaic image providing server 1 may perform a process for searching for a child region that satisfies the conditions where the posted image can be assigned from child regions formed if basic regions are divided on only a part of basic regions instead of on each of all the basic regions which are unassigned regions. The basic region to be processed may be randomly determined or may be determined based on a preset condition. For example, the mosaic image providing server 1 may search for a child region that satisfies the conditions where the posted image can be assigned from child regions formed if a basic region where the difference of the representative color value from that of the posted image is the smallest is divided.

In steps S106 and S114 in the candidate region search process in the embodiment described above, the mosaic image providing server 1 calculates the difference of the representative color value between the posted image and all the divided regions to which no posted image is assigned. However, it is possible to reduce the number of divided regions where the calculation is performed and reduce the calculation time by rearranging the divided regions in advance on the basis of the representative color values. For example, the system control unit 14 generates a list indicating the divided regions in ascending order of the representative color values of R, a list indicating the divided regions in ascending order of the representative color values of G, and a list indicating the divided regions in ascending order of the representative color values of B. When the system control unit 14 receives a posted image and calculates the representative value of the posted image, the system control unit 14 calculates the minimum value and the maximum value of the representative value where the difference from the representative value of the posted image is smaller than or equal to a threshold value for each of R, G, and B. The threshold value at this time may be different from the threshold value used to calculate the difference by the formula 1. Next, the system control unit 14 specifies a range of the divided regions where the difference of the representative value from that of the posted image is smaller than or equal to the threshold value by using the generated lists by, for example, a binary search method. The system control unit 14 performs the above process for each of R, G, and B. The system control unit 14 determines divided regions where the difference of the representative value from that of the posted image is smaller than or equal to the threshold value in all of R, G, and B to be the candidate regions.

In the embodiment described above, the mosaic image providing server 1 determines the candidate regions to which the posted image is assigned from the unassigned regions. However, the mosaic image providing server 1 may determine the candidate regions to which the posted image is assigned regardless of whether or not a posted image has already been assigned. For example, when a color of the posted image to be processed, which is tried to be assigned to a divided region, is closer to the color of the divided region than the color of the posted image which has already been assigned to the divided region, the mosaic image providing server 1 may assign the posted image to be processed to the divided region and assign the posted image which has already been assigned to the divided region to an unassigned region.

In the embodiment described above, the mosaic image providing server 1 determines the divided region where the difference of the representative color value from that of the posted image is the smallest to be the assignment target region. However, for example, the mosaic image providing server 1 may determine any divided regions among divided regions where the difference of the representative color value from that of the posted image is smaller than or equal to a threshold value to be the assignment target region.

In the embodiment described above, the mosaic image providing server 1 assigns one posted image to one divided region. However, the mosaic image providing server 1 may assign one posted image to a plurality of divided regions. For example, the mosaic image providing server 1 may assign the same posted image to a plurality of regions among the divided regions where the difference of the representative color value from that of the posted image is smaller than or equal to a threshold value.

In the embodiment described above, the mosaic image providing server 1 determines the assignment target region based on the representative color value of the posted image and the representative color values of the divided regions. However, for example, the mosaic image providing server 1 may determine the assignment target region based on a pattern of the posted image and patterns included in the divided regions. For example, the mosaic image providing server 1 may calculate the degrees of similarity between the pattern of the posted image and the patterns included in the divided regions and determine the assignment target region from divided regions where the degree of similarity is greater than or equal to a preset threshold value. For example, the mosaic image providing server 1 may calculate the degrees of similarity of an image including the pattern and the color between the posted image and the divided regions and determine the assignment target region from divided regions where the degree of similarity is greater than or equal to a preset threshold value.

In the embodiment described above, the mosaic image providing server 1 transmits the HTML document including the mosaic image display data to the user terminal 2 to cause the mosaic image to be displayed by the user terminal 2. However, the mosaic image providing server 1 may transmit image data of the mosaic image to the user terminal 2 without change. In this case, for example, the mosaic image providing server 1 generates image data of the mosaic image in which each posted image is placed to a position of an assigned region on the basis of the posted image data which have been acquired so far and registered in the posted image DB 12c and the assignment image numbers registered in the mosaic image DB 12d.

In the embodiment described above, the mosaic image providing server 1 can use images posted from a plurality of users to generate display data of one mosaic image. However, for example, the mosaic image providing server 1 may generate display data of the mosaic image by using only images posted from one user.

In the embodiment described above, the mosaic image providing server 1 includes the acquisition means, the first search means, the first assignment means, the dividing means, the second assignment means, the presentation means, and the like, and the mosaic image providing server 1 transmits display data to the user terminal 2, so that the mosaic image providing server 1 causes the mosaic image to be displayed by the user terminal 2. However, for example, a device such as the user terminal 2 may include the acquisition means, the first search means, the first assignment means, the dividing means, the second assignment means, the presentation means, and the like, and the device such as the user terminal 2 may divide the basic region, assign the posted image, generate the mosaic image, and causes the mosaic image to be displayed by a display in stand-alone mode.

Reference Signs List
1 Mosaic image providing server
2 User terminal
11 Communication unit
12 Storage unit
12a Member information DB
12b Original image DB
12c Posted image DB
12d Mosaic image DB
13 Input/output interface
14 System control unit 14a CPU
14b ROM
14c RAM
15 System bus
NW Network
S Mosaic image providing system

The invention claimed is:

1. An image providing device for providing a mosaic image of an original image divided into a plurality of regions, the image providing device comprising:
   an acquisition unit that acquires an image specified by a user;
   a first search unit that searches for a region satisfying conditions where the acquired image can be assigned;
   a first assignment unit that assigns the acquired image to the region searched for by the first search unit;
   a dividing unit that further divides any one of regions to which no image is assigned into a plurality of regions when there is no region satisfying the conditions where the acquired image can be assigned as a result of the search by the first search unit;
   a second assignment unit that assigns the acquired image to a region satisfying the conditions where the acquired image can be assigned among the plurality of regions formed by the division by the dividing unit; and
   a presentation unit that, on the basis of the assignment by the first assignment unit or the second assignment unit, causes a mosaic image in which the acquired image is placed to be presented.

2. The image providing device according to claim 1, further comprising:
   a determination unit that determines whether or not the number of regions to which no image is assigned is smaller than or equal to a preset number,
   wherein the dividing unit performs division only when it is determined that the number of regions to which no image is assigned is smaller than or equal to the preset number.

3. The image providing device according to claim 1, further comprising:
   a second search unit that, when there is no region satisfying the conditions where the acquired image can be assigned as a result of the search by the first search unit, searches for a region satisfying the conditions where the acquired image can be assigned from a plurality of regions formed if each of regions to which no image is assigned is divided,
   wherein the dividing unit divides a certain region among the regions to which no image is assigned, the certain region being a region from which a region searched for by the second search unit is formed if the certain region is divided.

4. The image providing device according to claim 1, further comprising:
   a second search unit that, when there is no region satisfying the conditions where the acquired image can be assigned as a result of the search by the first search unit, searches for a region satisfying the conditions where the acquired image can be assigned from a plurality of regions formed if a certain region to which no image is assigned is divided by each of a plurality of division modes different from each other,
   wherein the dividing unit divides the certain region by a division mode by which the region searched for by the second search unit is formed.

5. The image providing device according to claim 4, wherein
the division mode includes the number of regions formed by division, and
the smaller the number of regions formed by division the division mode includes, the more preferentially the dividing unit determines the division mode to be a division mode used to perform the division.

6. The image providing device according to claim 3, further comprising:
   a color information generation unit that generates in advance color information indicating a representative color of an image of each region formed if each region formed by dividing the original image in advance is divided by the dividing unit; and
   a storage unit that stores each piece of the generated color information,
   wherein, on the basis of color information indicating a representative color of the acquired image and color information indicating representative colors of images of regions to which no image is assigned, the first search unit searches for a region satisfying the conditions where the acquired image can be assigned, and
   the second search unit searches for a region satisfying the conditions where the acquired image can be assigned on the basis of the color information of the acquired image and the stored color information.

7. The image providing device according to claim 3, further comprising:
   a color information generation unit that, when the second search unit searches for a region satisfying the conditions where the acquired image can be assigned from a plurality of regions formed if a certain region to which no image is assigned is divided, generates color information indicating a representative color of images of the formed regions,
   wherein, on the basis of color information indicating a representative color of the acquired image and color information indicating representative colors of images of regions to which no image is assigned, the first search unit searches for a region satisfying the conditions where the acquired image can be assigned, and
   the second search unit searches for a region satisfying the conditions where the acquired image can be assigned on the basis of the color information of the acquired image and the generated color information.

8. An image processing method in an image providing device for providing a mosaic image of an original image divided into a plurality of regions, the image processing method comprising:
   an acquisition step of acquiring an image specified by a user;
   a first search step of searching for a region satisfying conditions where the acquired image can be assigned;
   a first assignment step of assigning the acquired image to the region searched for in the first search step;
   a dividing step of further dividing any one of regions to which no image is assigned into a plurality of regions when there is no region satisfying the conditions where the acquired image can be assigned as a result of the search in the first search step;
   a second assignment step of assigning the acquired image to a region satisfying the conditions where the acquired image can be assigned among the plurality of regions formed by the division in the dividing step; and
   a presentation step of, on the basis of the assignment in the first assignment step or the second assignment step, causing a mosaic image in which the acquired image is placed to be presented.

9. A non-transitory recording medium in which an image processing program is computer-readably recorded, the image processing program causing a computer, which is included in an image providing device for providing a mosaic image of an original image divided into a plurality of regions, to function as:
- an acquisition unit that acquires an image specified by a user;
- a first search unit that searches for a region satisfying conditions where the acquired image can be assigned;
- a first assignment unit that assigns the acquired image to the region searched for by the first search unit;
- a dividing unit that further divides any one of regions to which no image is assigned into a plurality of regions when there is no region satisfying the conditions where the acquired image can be assigned as a result of the search by the first search unit;
- a second assignment unit that assigns the acquired image to a region satisfying the conditions where the acquired image can be assigned among the plurality of regions formed by the division by the dividing unit; and
- a presentation unit that, on the basis of the assignment by the first assignment unit or the second assignment unit, causes a mosaic image in which the acquired image is placed to be presented.

* * * * *